United States Patent
Feng

(10) Patent No.: US 9,784,904 B2
(45) Date of Patent: Oct. 10, 2017

(54) DISPLAY SUBSTRATE, DISPLAY APPARATUS HAVING THE SAME, AND FABRICATING METHOD THEREOF

(71) Applicant: BOE TECHNOLOGY GROUP CO., LTD., Beijing (CN)

(72) Inventor: Jing Feng, Beijing (CN)

(73) Assignee: BOE TECHNOLOGY GROUP CO., LTD., Chaoyang District, Beijing (CN)

( * ) Notice: Subject to any disclaimer, the term of this patent is extended or adjusted under 35 U.S.C. 154(b) by 0 days.

(21) Appl. No.: 15/325,434

(22) PCT Filed: May 20, 2016

(86) PCT No.: PCT/CN2016/082878
§ 371 (c)(1),
(2) Date: Jan. 10, 2017

(87) PCT Pub. No.: WO2017/000705
PCT Pub. Date: Jan. 5, 2017

(65) Prior Publication Data
US 2017/0168223 A1 Jun. 15, 2017

(30) Foreign Application Priority Data
Jun. 30, 2015 (CN) .......................... 2015 1 0386105

(51) Int. Cl.
| F21V 8/00 | (2006.01) |
| G02F 1/1335 | (2006.01) |
| G02F 1/1343 | (2006.01) |
| G09G 3/20 | (2006.01) |
| G09G 3/36 | (2006.01) |

(52) U.S. Cl.
CPC ....... *G02B 6/0055* (2013.01); *G02F 1/13439* (2013.01); *G02F 1/133512* (2013.01);
(Continued)

(58) Field of Classification Search
CPC .................................................. G02B 6/0055
See application file for complete search history.

(56) References Cited

U.S. PATENT DOCUMENTS

| 7,768,595 B2 * | 8/2010 | Chang .................... G02B 26/04 349/66 |
| 2006/0067651 A1 | 3/2006 | Chui |

(Continued)

FOREIGN PATENT DOCUMENTS

| CN | 1696794 A | 11/2005 |
| CN | 101027596 A | 8/2007 |

(Continued)

OTHER PUBLICATIONS

International Search Report & Written Opinion dated Aug. 18, 2016 regarding PCT/CN2016/082878.

(Continued)

*Primary Examiner* — Phu Vu
(74) *Attorney, Agent, or Firm* — Intellectual Valley Law, P.C.

(57) ABSTRACT

The present application discloses a display substrate including a base substrate; and a plurality of pixels on the base substrate. Each of the plurality of pixels in the display substrate includes a color generating layer on the base substrate; a first reflective layer surrounding at least one side of the color generating layer in plan view of the base substrate; and a second reflective layer having a light transmissive area and a light reflective area, the light transmissive area spaced apart from the first reflective layer in a direction perpendicular to the base substrate, the light reflective area configured to be spaced apart from the color generating layer in the direction perpendicular to the base substrate by an adjustable distance relative to the color generating layer. The first reflective layer is configured to reflect an incident light transmitted through the light transmissive area to the light reflective area, the light reflective area and the color generating layer are configured to direct (Continued)

the incident light reflected by the first reflective layer in a direction so that it may pass through the color generating layer.

20 Claims, 18 Drawing Sheets

(52) U.S. Cl.
CPC ..... *G02F 1/134309* (2013.01); *G09G 3/2007* (2013.01); *G09G 3/3611* (2013.01); *G09G 2300/0426* (2013.01); *G09G 2320/0271* (2013.01)

(56) References Cited

U.S. PATENT DOCUMENTS

| | | |
|---|---|---|
| 2006/0158587 A1 | 7/2006 | Chang et al. |
| 2010/0053727 A1 | 3/2010 | Lee et al. |
| 2011/0292483 A1 | 12/2011 | Pakhchyan et al. |
| 2013/0194653 A1 | 8/2013 | Ma et al. |
| 2015/0103387 A1 | 4/2015 | Wu et al. |

FOREIGN PATENT DOCUMENTS

| | | |
|---|---|---|
| CN | 102902060 A | 1/2013 |
| CN | 103323970 A | 9/2013 |
| CN | 104081252 A | 10/2014 |
| WO | 2012173308 A1 | 12/2012 |
| WO | 2014153523 A1 | 9/2014 |
| WO | 2015054068 A1 | 4/2015 |

OTHER PUBLICATIONS

First Office Action in the Chinese Patent Application No. 201510386105.X, dated May 22, 2017; English translation attached.

\* cited by examiner

DISPLAY SUBSTRATE, DISPLAY APPARATUS HAVING THE SAME, AND FABRICATING METHOD THEREOF

CROSS-REFERENCE TO RELATED APPLICATION

This application is a national stage application under 35 U.S.C. §371 of International Application No. PCT/CN2016/082878, filed May 20, 2016, which claims priority to Chinese Patent Application No. 201510386105.X, filed Jun. 30, 2015, the contents of which are incorporated by reference in the entirety.

TECHNICAL FIELD

The present invention relates to display technology, more particularly, to a display substrate, a display apparatus having the same, and a fabricating method thereof.

BACKGROUND

Typically, a liquid crystal display (LCD) device includes an array substrate and a color filter substrate assembled together, and a liquid crystal layer between the array substrate and the color filter substrate. The liquid crystal layer includes liquid crystal molecules. The liquid crystal display device also includes an upper polarizer over the array substrate, and a lower polarizer over the color filter substrate on its light emitting side. The liquid crystal display device further includes a backlight light source on a side of the upper polarizer distal to the array substrate, and a light guide plate between the backlight light source and the upper polarizer. Light emitted from the backlight light source sequentially transmits through the light guide plate, the upper polarizer, the array substrate, the liquid crystal layer, the color filter substrate, and the lower polarizer. In response to a voltage applied to the liquid crystal layer, the optical anisotropy of the liquid crystal layer changes the light transmittance. The color filter substrate includes color filters filtering the light transmitted through the color filters, resulting in light of different colors for color display.

SUMMARY in one aspect, the present invention provides a display substrate comprising a base substrate; and a plurality of pixels on the base substrate. Each of the plurality of pixels comprises a color generating layer on the base substrate; a first reflective layer surrounding at least one side of the color generating layer in plan view of the base substrate; and a second reflective layer having a light transmissive area and a light reflective area, the light transmissive area spaced apart from the first reflective layer in a direction perpendicular to the base substrate, the light reflective area configured to be spaced apart from the color generating layer in the direction perpendicular to the base substrate by an adjustable distance relative to the color generating layer. The first reflective layer is configured to reflect an incident light transmitted through the light transmissive area to the light reflective area, the light reflective area and the color generating layer are configured to direct the incident light reflected by the first reflective layer in a direction so that it may pass through the color generating layer.

Optionally, a projection of the light transmissive area on the base substrate is substantially within that of the first reflective layer, and a projection of the color generating layer on the base substrate is substantially within that of the light reflective area.

Optionally, the display substrate further comprises a barrier layer having a plurality of spacers, the first reflective layer and the color generating layer spaced apart from the second reflective layer by the plurality of spacers in the direction perpendicular to the base substrate.

Optionally, the display substrate further comprises a black matrix array comprising a plurality of horizontal black matrix strips and a plurality of vertical black matrix strips intersecting each other in a same layer, and dividing a display region of the display substrate into a plurality of open areas; wherein a projection of the color generating layer on the base substrate is substantially within that of the plurality of open areas; a projection of the barrier layer and the first reflective layer on the base substrate is substantially within that of the black matrix array.

Optionally, the display substrate further comprises a transparent electrode layer comprising a plurality of transparent electrodes, wherein the projection of the color generating layer on the base substrate is substantially within that of the transparent electrode layer.

Optionally, the color generating layer is on a side of the transparent electrode layer distal to the base substrate.

Optionally, the transparent electrode layer comprises a plurality of strip electrodes, each of which extending through a plurality of pixels in a row and is sandwiched by two neighboring horizontal black matrix strips; and the second reflective layer comprises a plurality of vertical reflective strips, each of which sandwiched by two neighboring vertical black matrix strips.

Optionally, the transparent electrode layer comprises a plurality of block electrodes, wherein a projection of the transparent electrode layer on the base substrate is substantially within that of the plurality of open areas.

Optionally, the second reflective layer within each pixel comprises a light reflective area and at least a light transmissive area; the first reflective layer is configured to reflect an incident light transmitted through the at least one light transmissive area to the light reflective area, the light reflective area and the color generating layer are configured to direct the incident light reflected by the first reflective layer in a direction so that it may pass through the color generating layer; wherein a projection of the light reflective area on the base substrate is substantially within that of the plurality of open areas, and a projection of the at least one light transmissive area on the base substrate is substantially within that of the black matrix array.

Optionally, the projection of the at least one light transmissive area on the base substrate is substantially within that of the first reflective layer; and the projection of the color generating layer on the base substrate is substantially within that of the light reflective area.

Optionally, the projection of the at least one light transmissive area on the base substrate substantially overlaps with that of the first reflective layer; and the projection of the color generating layer on the base substrate substantially overlaps with that of the light reflective area.

Optionally, the first reflective layer in each pixel abuts at least two sides of the color generating layer in plan view of the base substrate; the barrier layer in each pixel comprises at least two spacers on at least two opposite sides of the color generating layer in plan view of the base substrate, respectively; each of the at least two spacers spaced apart from the color generating layer by the first reflective layer in plan view of the base substrate; and the second reflective layer is on a side of the barrier layer distal to the base substrate, the second reflective layer and the color generating layer are spaced apart by the at least two spacers of the barrier layer.

Optionally, the display substrate further comprises a light condensing layer on a peripheral region of the display substrate for introducing the incident light from a light source.

Optionally, the first reflective layer is a triangular prism having a reflective surface, a projection of the reflective surface on the base substrate substantially overlaps with that of the light transmissive area.

Optionally, the color generating layer is a color filter.

In another aspect, the present invention provides a method of fabricating a display substrate comprising forming a color generating layer on the base substrate; forming a first reflective layer surrounding at least one side of the color generating layer in plan view of the base substrate; and forming a second reflective layer having a light transmissive area and a light reflective area, the light transmissive area spaced apart from the first reflective layer in a direction perpendicular to the base substrate, the light reflective area configured to be spaced apart from the color generating layer in the direction perpendicular to the base substrate by an adjustable distance relative to the color generating layer. The first reflective layer is configured to reflect an incident light transmitted through the light transmissive area to the light reflective area, the light reflective area and the color generating layer are configured to direct the incident light reflected by the first reflective layer in a direction so that it may pass through the color generating layer.

Optionally, prior to forming the second reflective layer, the method further comprises forming a sacrifice layer on a side of the color generating layer and the first reflective layer distal to the base substrate.

Optionally, the step of forming the second reflective layer comprises forming a reflective material layer on a side of the sacrifice layer distal to the bases substrate; and forming the light transmissive area and the light reflective area in the reflective material layer thereby forming the second reflective layer.

Optionally, subsequent to the step of forming the light transmissive area and the light reflective area, the method further comprises removing the sacrifice layer Optionally, prior to forming the sacrifice layer, the method further comprises forming a barrier layer having a plurality of spacers, the first reflective layer and the color generating layer spaced apart from the second reflective layer by the plurality of spacers in the direction perpendicular to the base substrate; the sacrifice layer is formed in areas between the plurality of spacers.

In another aspect, the present invention provides a display apparatus comprising a display substrate as described herein, a backlight module comprising a frame for retaining the display substrate; and a light guide plate on a side of the frame proximal to the display substrate. The light guide plate comprises a light incident surface and a light emitting surface, the light emitting surface proximal to the display substrate for providing the incident light to the light transmissive area in the display substrate.

Optionally, the backlight module further comprises a reflector at a position corresponding to the light condensing layer in the display substrate, the reflector is configured to reflect the incident light introduced by the light condensing layer into the light guide plate.

Optionally, the backlight module further comprises a light source proximal to the light incident surface of the light guide plate providing light to the light guide plate.

Optionally, the reflector is a triangular prism having a reflective surface, a projection of the reflective surface on the base substrate substantially overlaps with that of the light condensing layer.

Optionally, the display apparatus further comprises a circuit board, wherein the circuit board comprises a plurality of row driving circuits electrically connected to the second reflecting layer for applying a first voltage to the second reflecting layer, and a plurality of column driving circuits electrically connected to the transparent electrode layer for applying a second voltage to the transparent electrode layer.

In another aspect, the present invention provides a method of controlling display of an image on a display apparatus having a display substrate comprising a base substrate and a plurality of pixels on the base substrate; each pixel comprising a color generating layer on the base substrate; a first reflective layer surrounding at least one side of the color generating layer in plan view of the base substrate; a second reflective layer having a light transmissive area and a light reflective area; the light transmissive area spaced apart from the first reflective layer in a direction perpendicular to the base substrate, the light reflective area configured to be spaced apart from the color generating layer in the direction perpendicular to the base substrate by an adjustable distance relative to the color generating layer; and a transparent electrode layer comprising a plurality of transparent electrodes; wherein the first reflective layer is configured to reflect an incident light transmitted through the light transmissive area to the light reflective area, the light reflective area and the color generating layer are configured to direct the incident light reflected by the first reflective layer in a direction so that it may pass through the color generating layer; and the projection of the color generating layer on the base substrate is substantially within that of the transparent electrode layer; the method comprising applying a first voltage to the second reflecting layer; applying a second voltage to the transparent electrode layer; and adjusting a gray level gradient of a pixel of an image by adjusting a voltage difference between the first voltage and the second voltage. The gray level gradient is adjusted by changing the adjustable distance, which is in turn controlled by adjusting the voltage difference.

Optionally, the gray level gradient is decreased by applied a first voltage and a second voltage in opposite directions of polarity.

Optionally, the gray level gradient is increased by applied a first voltage and a second voltage in a same direction of polarity.

BRIEF DESCRIPTION OF THE FIGURES

The following drawings are merely examples for illustrative purposes according to various disclosed embodiments and are not intended to limit the scope of the present invention.

DETAILED DESCRIPTION

Figure 1:
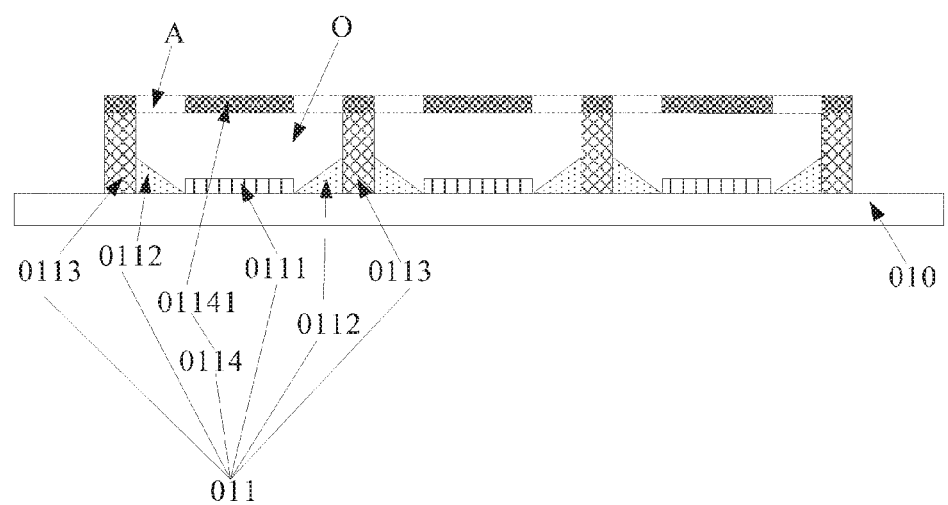
FIG. 1 is a diagram illustrating the structure of a display substrate in some embodiments.

The disclosure will now describe more specifically with reference to the following embodiments. It is to be noted that the following descriptions of some embodiments are presented herein for purpose of illustration and description only. It is not intended to be exhaustive or to be limited to the precise form disclosed.

In the conventional liquid crystal display devices, light from the backlight light source transmits through the light guide plate, the upper polarizer, the array substrate, the liquid crystal layer, the color filter substrate, and the lower polarizer. The upper polarizer, the liquid crystal layer and the lower polarizer all partially absorb the light, resulting in loss of light illuminance and energy.

The present disclosure provides a novel display substrate that overcomes the disadvantages and shortcoming of the convention display devices. In some embodiments, the display substrate includes a base substrate and a plurality of pixels on the base substrate. As defined herein, the term "pixel" refers to the smallest addressable unit in a display substrate or a display panel having the display substrate. In some instances, a pixel is an independent and minimum unit the intensity and/or color of the light emitted from which can be controlled. For example, a pixel may be a smallest addressable unit that emits a red light.

In some embodiments, the display substrate includes a color generating layer on the base substrate, a first reflective layer, a barrier layer, and a second reflective layer. The first reflective layer and the second reflective layer are in different layers. Optionally, the first reflective layer and the color generating layer are in a same layer. Optionally, the first reflective layer and the color generating layer are in different layers.

As defined herein, the term "color generating layer" encompasses both (1) a layer having light absorptive material that absorbs light of one frequency range but largely transmits light of a different frequency range; and (2) a layer having color-changing material or color-converting material that absorbs light of one frequency range and re-emits light at a second, lower frequency range. Optionally, the color generating layer is a color filter. Optionally, the color generating layer includes quantum dots. The color generating layer may be a red color generating layer, a green color generating layer, a blue color generating layer, and a white color generating layer, etc. Optionally, the color generating layer may be a red color filter, a green color filter, a blue color filter, and a white color filter, etc.

Within each pixel, the color generating layer, the first reflective layer, the barrier layer, and the second reflective layer define a hollow chamber. In some embodiments, the hollow chamber has a first wall (e.g., a lower wall) proximal to the base substrate, a second wall (e.g., an upper wall) opposite to the first wall and distal to the base substrate, and a sidewall connecting the first wall and the second wall. Optionally, at least of a portion of the first wall formed by the first reflective layer and the color generating layer, at least a portion of the second wall formed by the second reflective layer, and at least a portion of the sidewall formed by the barrier layer. The hollow chamber further includes an orifice on the first wall) for allowing an incident light to enter the hollow chamber. The incident light entered into the hollow chamber is sequentially reflected by the first reflective layer and the second reflective layer, and exits the hollow chamber through the color generating layer for image display. Color image display may be achieved in a display substrate having a plurality of pixels having color generating layers of different colors.

Specifically, in some embodiments, each pixel includes a color generating layer on the base substrate; a first reflective layer surrounding at least one side of the color generating layer in plan view of the base substrate; and a second reflective layer having a light transmissive area and a light reflective area. Optionally, the first reflective layer and the color generating layer spaced apart from the second reflective layer in a direction perpendicular to the base substrate. Optionally, the light transmissive area is spaced apart from the first reflective layer in a direction perpendicular to the base substrate. Optionally, the light reflective area is configured to be spaced apart from the color generating layer in the direction perpendicular to the base substrate by an adjustable distance relative to the color generating layer.

The light transmissive area is configured to allow an incident light to transmit through and irradiate on the first reflective layer. The first reflective layer is configured to reflect an incident light transmitted through the light transmissive area to the light reflective area. The light reflective area and the color generating layer are configured to direct the incident light reflected by the first reflective layer in a direction so that it may pass through the color generating layer for image display.

In some embodiments, a projection of the light transmissive area on the base substrate is substantially within that of the first reflective layer. In some embodiments, a projection of the color generating layer on the base substrate is substantially within that of the light reflective area. Optionally, a projection of the light transmissive area on the base substrate is substantially within that of the first reflective layer, and a projection of the color generating layer on the base substrate is substantially within that of the light reflective area.

In some embodiments, the second reflective layer within each pixel includes a light reflective area and at least a light transmissive area. Optionally, the first reflective layer is configured to reflect an incident light transmitted through the at least one light transmissive area to the light reflective area. The light reflective area and the color generating layer are configured to direct the incident light reflected by the first reflective layer in a direction so that it may pass through the color generating layer. Optionally, a projection of the light reflective area on the base substrate is substantially within that of the plurality of open areas. Optionally, a projection of the at least one light transmissive area on the base substrate is substantially within that of the black matrix array. Optionally, a projection of the light reflective area on the base substrate is substantially within that of the plurality of open areas, and a projection of the at least one light transmissive area on the base substrate is substantially within that of the black matrix array.

In some embodiments, the barrier layer includes a plurality of spacers. The first reflective layer and the color generating layer are spaced apart from the second reflective layer by the plurality of spacers in the direction perpendicular to the base substrate.

In some embodiments, the display substrate further includes a black matrix array having a plurality of black matrix strips along a first direction (e.g., the horizontal direction) and a plurality of black matrix strips along a second direction (e.g., the vertical direction). The plurality of black matrix strips along the first direction and the plurality of black matrix strips along the second direction intersect each other, dividing a display region of the display substrate into a plurality of open areas. Optionally, the plurality of black matrix strips along the first direction and the plurality of black matrix strips along the second direction are in a same layer.

In some embodiments, a projection of the color venerating layer on the base substrate is substantially within that of the plurality of open areas. For example, the color generating layer may include a plurality of color generating blocks, each block corresponding to each pixel. The projection of each block on the base substrate is substantially within that of the corresponding open area in the pixel.

In some embodiments, a projection of the barrier layer and the first reflective layer on the base substrate is substantially within that of the black matrix array. Optionally, the barrier layer and the first reflective layer are substantially on the plurality of black matrix strips along the first direction. Optionally, the barrier layer and the first reflective layer are substantially on the plurality of black matrix strips along the second direction. Optionally, the barrier layer and the first reflective layer are substantially on both the plurality of black matrix strips along the first direction and the plurality of black matrix strips along the second direction.

In some embodiments, the display substrate further includes a transparent electrode layer. Optionally, the transparent electrode layer includes a plurality of transparent electrodes. The projection of the color generating layer on the base substrate is substantially within that of the transparent electrode layer. Optionally, the color generating layer is on a side of the transparent electrode layer distal to the base substrate. Optionally, the transparent electrode layer is on a side of the color generating layer distal to the base substrate.

Numerous embodiments may be practiced to form the transparent electrode layer. The transparent electrode layer may include a plurality of transparent electrodes. The transparent electrode may be any appropriate shape and dimension. In some embodiments, the transparent electrode layer includes a plurality of block electrodes. Each block electrode is substantially within an open area in a pixel, i.e., a projection of the transparent electrode layer on the base substrate is substantially within that of the plurality of open areas. Optionally, each block electrode substantially overlaps with a color generating layer and an open area in plan view of the substrate. In some embodiments, the transparent electrode layer includes a plurality of strip electrodes, each of which extending through a plurality of pixels in a direction (e.g., in a row or in a column). Optionally, each strip electrode extends through a plurality of pixels in a row and is sandwiched by two neighboring horizontal black matrix strips; and the second reflective layer comprises a plurality of vertical reflective strips, each of which sandwiched by two neighboring vertical black matrix strips; the length direction of each strip electrode substantially perpendicular to the length direction of each reflective strip. Optionally, each strip electrode extends through a plurality of pixels in a column and is sandwiched by two neighboring vertical black matrix strips; and the second reflective layer comprises a plurality of horizontal reflective strips, each of which sandwiched by two neighboring horizontal black matrix strips; the length direction of each strip electrode substantially perpendicular to the length direction of each reflective strip.

In some embodiments, the orifice of the hollow chamber is a light transmissive area in the second reflective layer. For instance, the second reflective layer within each pixel may include at least one (e.g., two) light transmissive area and a light reflective area. Optionally, the projection of the at least one light transmissive area on the base substrate is substantially within that of the first reflective layer. Optionally, the projection of the color generating layer on the base substrate is substantially within that of the light reflective area. Optionally, the projection of the at least one light transmissive area on the base substrate substantially overlaps with that of the first reflective layer. Optionally, the projection of the color generating layer on the base substrate substantially overlaps with that of the light reflective area. Optionally, the projection of the light reflective area on the base substrate is substantially within that of the plurality of open areas. Optionally, the projection of the at least one light transmissive area is substantially within that of the black matrix array.

The incident light enters into the hollow chamber through the at least one light transmissive area. The light entered into the hollow chamber is sequentially reflected by the first reflective layer and the light reflective area. The light reflected by the light reflective area in the second reflective layer may be transmitted towards the color generating layer, and exits the hollow chamber through the color generating layer for image display.

In some embodiments, the first reflective layer in each pixel abuts at least two sides of the color generating layer in plan view of the base substrate. Optionally, the barrier layer in each pixel includes at least two spacers on at least two opposite sides of the color generating layer in plan view of the base substrate, respectively; each of the at least two spacers spaced apart from the color generating layer by the first reflective layer in plan view of the base substrate. Optionally, the barrier layer includes four spacers surrounding the color generating layer in plan view of the base substrate, the spacers spaced apart from the color generating layer by the first reflective layer in plan view of the base substrate. Optionally, the second reflective layer is on a side the barrier layer distal to the base substrate, the second reflective layer and the color generating layer spaced apart by spacers of the barrier layer.

In another aspect, the present disclosure provides a method of fabricating a display substrate. In some embodiments, the method includes forming a plurality of pixels on a base substrate. The step of forming each pixel includes forming a color generating layer on the bases substrate; forming a first reflective layer; forming a barrier layer; and forming a second reflective layer. Optionally, the first reflective layer and the color generating layer are in a same layer. Optionally, the first reflective layer and the color generating layer are in different layers.

Within each pixel, the color generating layer, the first reflective layer, the barrier layer, and the second reflective layer define a hollow chamber. In some embodiments, the hollow chamber has a first wall (e.g., a lower wall) proximal to the base substrate, a second wall (e.g., an upper wall) opposite to the first wall and distal to the base substrate, and a sidewall connecting the first wall and the second wall. Optionally, at least of a portion of the first wall formed by the first reflective layer and the color generating layer, at least a portion of the second wall formed by the second reflective layer, and at least a portion of the sidewall formed by the barrier layer. The hollow chamber further includes an orifice (e.g., on the first wall) for allowing an incident light to enter the hollow chamber. The incident light entered into the hollow chamber is sequentially reflected by the first reflective layer and the second reflective layer, and exits the hollow chamber through the color generating layer for image display. Color image display may be achieved in a display substrate having a plurality of pixels having color generating layers of different colors.

Specifically, in some embodiments, the method includes forming a color generating layer on the base substrate; forming a first reflective layer surrounding at least one side of the color generating layer in plan view of the base substrate; and forming a second reflective layer having a light transmissive area and a light reflective area. Optionally, the light transmissive area is spaced apart from the first reflective layer in a direction perpendicular to the base substrate. Optionally, the light reflective area is configured to be spaced apart from the color generating layer in the direction perpendicular to the base substrate by an adjustable distance relative to the color generating layer.

The light transmissive area is configured to allow an incident light to transmit through and irradiate on the first reflective layer. The first reflective layer is configured to reflect an incident light transmitted through the light transmissive area to the light reflective area. The light reflective area and the color generating layer are configured to direct the incident light reflected by the first reflective layer in a direction so that it may pass through the color generating layer for image display.

In some embodiments, the method further includes forming a black matrix array having a plurality of black matrix strips along a first direction (e.g., the horizontal direction) and a plurality of black matrix strips along a second direction (e.g., the vertical direction). The plurality of black matrix strips along the first direction and the plurality of black matrix strips along the second direction intersect each other, dividing a display region of the display substrate into a plurality of open areas. Optionally, the plurality of black matrix strips along the first direction and the plurality of black matrix strips along the second direction are in a same layer.

In some embodiments, a projection of the color generating layer on the base substrate is substantially within that of the plurality of open areas. For example, the color generating layer may include a plurality of color generating blocks, each block corresponding to each pixel. The projection of each block on the base substrate is substantially within that of the corresponding open area in the pixel.

In some embodiments, a projection of the barrier layer and the first reflective layer is substantially within that of the black matrix array. Optionally, the barrier layer and the first reflective layer are substantially on the plurality of black matrix strips along the first direction. Optionally, the barrier layer and the first reflective layer are substantially on the plurality of black matrix strips along the second direction. Optionally, the barrier layer and the first reflective layer are substantially on both the plurality of black matrix strips along the first direction and the plurality of black matrix strips along the second direction.

In some embodiments, the method further includes forming a transparent electrode layer. Optionally, the step of forming the transparent electrode layer includes forming a plurality of transparent electrodes. The projection of the color generating layer on the base substrate is substantially within that of the transparent electrode layer. Optionally, the color generating layer is formed on a side of the transparent electrode layer distal to the base substrate. Optionally, the transparent electrode layer is formed on a side of the color generating layer distal to the base substrate.

In some embodiments, the step of forming the transparent electrode layer includes forming a plurality of strip electrodes, each of which extending through a plurality of pixels in a direction (e.g., in a row or in a column). Optionally, each strip electrode extending through a plurality of pixels in a row and is sandwiched by two neighboring horizontal black matrix strips; and the step of forming the second reflective layer includes forming a plurality of vertical reflective strips, each of which sandwiched by two neighboring vertical black matrix strips; the length direction of each strip electrode substantially perpendicular to the length direction of each reflective strip. Optionally, each strip electrode extends through a plurality of pixels in a column and is sandwiched by two neighboring vertical black matrix strips; and the step of forming the second reflective layer includes forming a plurality of horizontal reflective strips, each of which sandwiched by two neighboring horizontal black matrix strips; the length direction of each strip electrode substantially perpendicular to the length direction of each reflective strip.

In some embodiments, the step of forming the transparent electrode layer includes forming a plurality of block electrodes. Each block electrode is substantially within an open area in a pixel, i.e., a projection of the transparent electrode layer on the base substrate is substantially within that of the plurality of open areas. Optionally, each block electrode substantially overlaps with a color generating layer and an open area in plan view of the substrate.

In some embodiments, the step of forming the second reflective layer within each pixel includes forming at least one light transmissive area in the second reflective layer; and forming a light reflective area in the second reflective layer. Optionally, the projection of the at least one light transmissive area on the base substrate is substantially within that of the first reflective layer. Optionally, the projection of the color generating layer on the base substrate is substantially within that of the light reflective area. Optionally, the projection of the at least one light transmissive area on the base substrate substantially overlaps with that of the first reflective layer. Optionally, the projection of the color generating layer on the base substrate substantially overlaps with that of the light reflective area. Optionally, the projection of the light reflective area on the base substrate is substantially within that of the plurality of open areas. Optionally, the projection of the at least one light transmissive area is substantially within that of the black matrix array.

The incident light enters into the hollow chamber through the at least one light transmissive area. The light entered into the hollow chamber is sequentially reflected by the first reflective layer and the light reflective area. The light reflected by the light reflective area in the second reflective layer may be transmitted towards the color generating layer, and exits the hollow chamber through the color generating layer for image display.

In some embodiments, the first reflective layer in each pixel is formed abutting at least two sides of the color generating layer in plan view of the base substrate. Optionally, the step of forming the barrier layer in each pixel includes forming at least two spacers on at least two opposite sides of the color generating layer in plan view of the base substrate, respectively; each of the at least two spacers spaced apart from the color generating layer by the first reflective layer in plan view of the base substrate. Optionally, the step of forming the barrier layer in each pixel includes forming four spacers surrounding the color generating layer in plan view of the base substrate, the spacers spaced apart from the color generating layer by the first reflective layer in plan view of the base substrate. Optionally, the second reflective layer is formed on a side the barrier layer distal to the base substrate, the second reflective layer and the color generating layer spaced apart by spacers of the barrier layer.

In some embodiments, the method further includes forming a sacrifice layer on a side of the color generating layer and the first reflective layer distal to the base substrate prior to the step of forming the second reflective layer. As explained in further detail below as exemplified by embodiments, the step of forming the second reflective layer may include forming a reflective material layer on a side of the sacrifice layer distal to the bases substrate; and forming the light transmissive area and the light reflective area in the reflective material layer thereby forming the second reflective layer. Subsequent to the step of forming the light transmissive area and the light reflective area, the sacrifice layer is then removed.

In some embodiments, prior to forming the sacrifice layer a barrier layer is formed to define an area for forming the sacrifice layer. Accordingly, the method may include forming a barrier layer having a plurality of spacers; and forming the sacrifice layer in areas between the plurality of spacers. After the barrier layer and the sacrifice layer are formed, the first reflective layer and the color generating layer are spaced apart from the second reflective layer by the sacrifice layer and the barrier layer in the direction perpendicular to the base substrate. After the sacrifice layer is removed, the first reflective layer and the color generating layer are spaced apart from the second reflective layer by the plurality of spacers in the direction perpendicular to the base substrate.

In another aspect, the present disclosure provides a display apparatus having a display substrate described herein or manufactured by a method described herein, and a backlight module. Optionally, the backlight module includes a frame for retaining the display substrate and a light guide plate on a side of the frame proximal to the display substrate. The light guide plate includes a light incident surface and a light emitting surface, the light emitting surface proximal to the display substrate for providing the incident light to the hollow chamber in the display substrate.

In another aspect, the present disclosure provides a novel backlight module. In some embodiments, the backlight module includes a frame for retaining the display substrate, a light guide plate on a side of the frame proximal to the display substrate, and a reflector between the light guide plate and the frame for reflecting light into the light incident surface of the light guide plate. In some embodiments, the backlight module includes a frame for retaining the display substrate, a light guide plate on a side of the frame proximal to the display substrate, and a light source between the light guide plate and the frame for providing light to the light incident surface of the light guide plate.

In another aspect, the present disclosure provides a method of controlling display of an image on a display apparatus, the display apparatus includes a display apparatus as described herein or manufactured by a method described herein. In some embodiments, the controlling method includes applying a first voltage to the second reflecting layer; applying a second voltage to the transparent electrode layer; and adjusting a gray level gradient of a pixel of an image by adjusting a voltage difference between the first voltage and the second voltage. As explained in further detail below as exemplified by embodiments, by adjusting the voltage difference between the first voltage and the second voltage, the adjustable distance between the light reflective area and the color generating layer in the direction perpendicular to the base substrate may be changed. In turn, by changing the adjustable distance between the light reflective area and the color generating layer in the direction perpendicular to the base substrate, the gray level gradient of a pixel of an image may be changed. For example, when a first voltage and a second voltage in opposite directions of polarity are applied to the second reflecting layer and the transparent electrode layer, respectively, the gray level gradient may be decreased. Conversely, when a first voltage and a second voltage in a same direction of polarity are applied to the second reflecting layer and the transparent electrode layer, respectively, the gray level gradient may be increased.

FIG. 1 is a diagram illustrating the structure of a display substrate in some embodiments. Referring to FIG. 1, the display substrate 01 in the embodiment includes a base substrate 010. The base substrate 010 may be made of any appropriate material, e.g., a solid, non-metal transparent material such as glass, quartz, and a transparent resin.

The display substrate further includes at least one pixel 011 on the base substrate 010 within the display region.

As shown in FIG. 1, each pixel 011 in the embodiment includes a color generating layer 0111 on the base substrate 010; a first reflective layer 0112 surrounding the color generating layer 0111 (e.g., on two sides or on all four sides) in plan view of the base substrate 010; a barrier layer 0113 on at least two opposite sides of the color generating layer 0111 in plan view of the base substrate 010, the barrier layer 0113 and the color generating layer 0111 spaced apart by the first reflective layer 0112; and a second reflective layer 0114 on a side the barrier layer 0113 distal to the base substrate 010, the second reflective layer 0114 and the color generating layer 0111 spaced apart by the barrier layer 0113.

The second reflective layer 0114 includes at least one light transmissive area A and a light reflective area 01141. The light transmissive area A corresponds to the first reflective layer 0112, the projection of the light transmissive area A on the base substrate 010 substantially overlaps with that of the first reflective layer 0112. Optionally, the projection of the light transmissive area A on the base substrate 010 is substantially within that of the first reflective layer 0112. The light reflective area 01141 corresponds to the color generating layer 0111, the projection of the color generating layer 0111 on the base substrate 010 substantially overlaps with that of the light reflective area 01141. Optionally, the projection of the color generating layer 0111 on the base substrate 010 is substantially within that of the light reflective area 01141.

In each pixel 011, the color generating layer 0111, the first reflective layer 0112, the barrier layer 0113, and the second reflective layer 0114 form a hollow chamber O.

Based on the above, the present disclosure provides a display substrate having a plurality of pixels, each of which includes a hollow chamber O formed by a color generating layer, a first reflective layer, a barrier layer and a second reflective layer. The display substrate is assembled with a backlight module to form a display panel. In the display panel, light provided by the backlight module enters into the hollow chamber O through a light transmissive area A in the second reflective layer. The light is reflected by the first reflective layer 0112 and the second reflective layer 0114, and exits the hollow chamber O through the color generating layer 0111. Accordingly, the present display panel does not require a liquid crystal layer or a polarizer. Light absorption by the liquid crystal layer and the polarizer is avoided in the present display panel. Thus, loss of light illuminance and energy is minimized in the present display panel and display apparatus.

Figure 2:
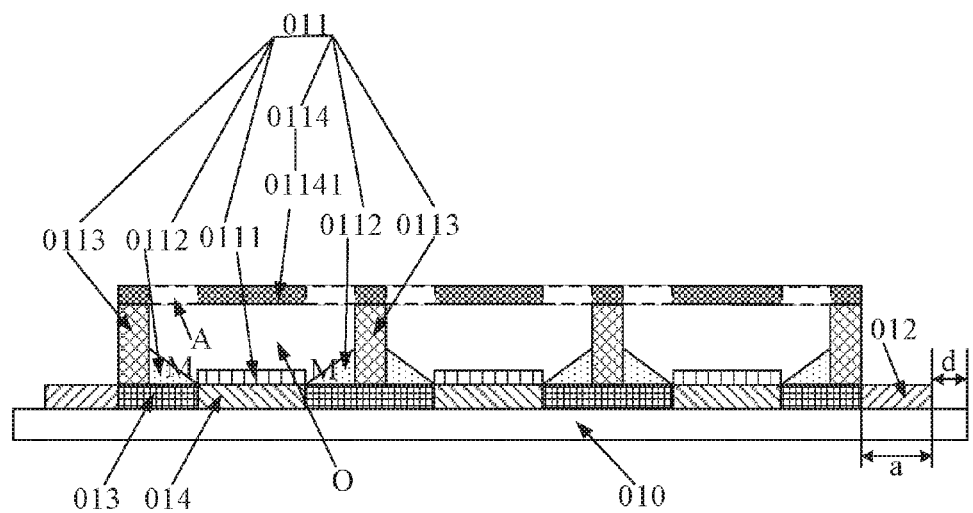
FIG. 2 is a diagram illustrating the structure of a display substrate in some embodiments.

FIG. 2 is a diagram illustrating the structure of a display substrate in some embodiments. Referring to FIG. 2, the display substrate 01 in the embodiment includes a base substrate 010. The base substrate 010 may be made of any appropriate material, e.g., a solid, non-metal transparent material such as glass, quartz, and a transparent resin.

The display substrate further includes at least one pixel 011 on the base substrate 010 within the display region.

As shown in FIG. 2, each pixel 011 in the embodiment includes a color generating layer 0111 on the base substrate 010; a first reflective layer 0112 surrounding the color generating layer 0111 (e.g., on two sides or on all four side) in plan view of the base substrate 010; a barrier layer 0113 on at least two opposite sides of the color generating layer 0111 in plan view of the base substrate 010, the barrier layer 0113 and the color generating layer 0111 spaced apart by the first reflective layer 0112; and a second reflective layer 0114 on a side the barrier layer 0113 distal to the base substrate 010, the second reflective layer 0114 and the color generating layer 0111 spaced apart by the barrier layer 0113.

In some embodiments, the color generating layer 0111 is a color filter layer comprising a plurality of color filters such as a red color filter, a green color filter, a blue color filter and a yellow color filter. The color generating layer 0111 may be made by a resin material and patterned by, e.g., exposure and developing processes. In some embodiments, the first reflective layer 0112 has a triangular prism shape with a triangular cross-section. For example, the first reflective layer 0112 includes a plurality of triangular prisms (e.g., 2 or 4 triangular prisms) in each pixel, each of which abutting a side of the color generating layer 0111. In some cases, each triangular prism of the first reflective layer 0112 includes a reflective film over one of the rectangular sides, e.g., a reflective metal film such as an aluminum film or an aluminum alloy film over a rectangular side M of each triangular prism. The rectangular side M corresponds to the light transmissive area A in the second reflective layer, and the reflective film reflects light entered into the chamber O through each light transmissive area A. Optionally, an angle between the base substrate 010 and the rectangular side M of each triangular prism (or the reflective film) is in the range of about 20° to about 70°. The two rectangular sides other than the rectangular side M may be in contact with the barrier layer 0113 and a display region on the base substrate 010, respectively. Optionally, the triangular prism is a right triangular prism having a rectangular side M, and two other rectangular sides perpendicular to each other and in contact with the barrier layer 0113 and a display region on the base substrate 010, respectively. Optionally, the first reflective layer 0112 is formed in a single patterning process. Optionally, the reflective layer 0112 is made of a resin material, and patterned by, e.g., exposure and developing processes. Optionally, the color generating layer 0111, the first reflective layer 0112, and the barrier layer 0113 are in different layers. Optionally, the color generating layer 0111, the first reflective layer 0112, and the barrier layer 0113 are in a same layer.

In some embodiment, the second reflective layer 0114 include at least one light transmissive area A and a light reflective area 01141. The light transmissive area A corresponds to the first reflective layer 0112, the projection of the light transmissive area A on the base substrate 010 substantially overlaps with that of the first reflective layer 0112. Optionally, the projection of the light transmissive area A on the base substrate 010 is substantially within that of the first reflective layer 0112. The light reflective area 01141 corresponds to the color generating layer 0111, the projection of the color generating layer 0111 on the base substrate 010 substantially overlaps with that of the light reflective area 01141. Optionally, the projection of the color generating layer 0111 on the base substrate 010 is substantially within that of the light reflective area 01141. In each pixel 011, the color generating layer 0111, the first reflective layer 0112, the barrier layer 0113, and the second reflective layer 0114 form a hollow chamber O. In a display panel having the present display substrate, light provided by a backlight module enters into the hollow chamber O through a light transmissive area A in the second reflective layer. The light is reflected by the rectangular side M of the first reflective layer 0112. Light reflected by the first reflective layer 0112 is transmitted to the second reflective layer 0114, and reflected by the light reflective area 01141 in the second reflective layer 0114. The reflected light exits the hollow chamber O through the color generating layer 0111, achieving color display in the display panel. The light reflective area 01141 of the second reflective layer 0114 may include a reflective film, e.g., a reflective metal film such as an aluminum film or an aluminum alloy film. The light transmissive area A of the second reflective layer 0114 may be a gap in the second reflective layer 0114 in-between the light reflective film, and may be patterned by, e.g., exposure and developing processes.

Optionally, the display substrate 01 includes a light condensing layer 012 in a peripheral region (e.g., a non-display region) of the display substrate 01. The light condensing layer 012 may be made of any appropriate material such as a resin material, and may have any appropriate width and/or thickness suitable for a particular design. Optionally, the light condensing layer 012 has a width of about 5 mm. As defined herein, the term "width of the light condensing layer" refers to a distance between a first side of the light condensing layer 012 proximal to the barrier layer 0113 and a second side of the light condensing layer 012 distal to the barrier layer 0113 (e.g., see the width "a" in FIG. 2). Optionally, a space on the base substrate 010 on a side of the light condensing layer 012 distal to the barrier layer 0113 is reserved for receiving a backlight module during assembly of the display panel. Optionally, the space has a width of d (see, e.g., FIG. 2).

In some embodiments, the display substrate 01 includes a black matrix array 013 and a transparent electrode layer 014. The transparent electrode layer 014 may be made of any appropriate transparent conductive material, e.g., indium tin oxide (ITO). Optionally, the black matrix array 013 includes a plurality of spaced-apart horizontal black matrix strips and a plurality of spaced-apart vertical black matrix strips intersecting each other in a same layer. The plurality of spaced-apart horizontal black matrix strips and the plurality of spaced-apart vertical black matrix strips divide the display region of the display substrate into a plurality of open areas. The transparent electrode layer 014 is within the open areas. Optionally, the transparent electrode layer 014 includes a plurality of transparent electrodes, each of which is within an open area form by the plurality of horizontal black matrix strips and the plurality of vertical black matrix strips. Optionally, the display substrate includes a color generating layer 0111 having a plurality of color generating blocks, each of which is on a side of each open area distal to the base substrate 010. Optionally, the barrier layer 0113 and the first reflective layer 0112 are formed on the plurality of vertical black matrix strips. Optionally, the barrier layer 0113 and the first reflective layer 0112 are formed on the plurality of horizontal black matrix strips. Optionally, the barrier layer 0113 and the first reflective layer 0112 are formed on both the plurality of vertical black matrix strips and the plurality of horizontal black matrix strips. Optionally, the first reflective layer 0112 includes a plurality of triangular prisms (e.g., 2 or 4 triangular prisms) in each pixel. Optionally, each triangular prism of the first reflective layer 0112 includes a reflective film over a rectangular side M of each triangular prism, and two other rectangular sides in contact with the black matrix array 013 and the barrier layer 0113, respectively. For example, when the first reflective layer 0112 is formed on the plurality of vertical black matrix strips, one rectangular side of the first reflective layer 0112 is in contact with the vertical black matrix strips, and the rectangular side M forms an angle with the vertical black matrix strips in the range of about 20° to about 70°. When the first reflective layer 0112 is formed on the plurality of horizontal black matrix strips, one rectangular side of the first reflective layer 0112 is in contact with the horizontal black matrix strips, and the rectangular side M forms an angle with the horizontal black matrix strips in the range of about 20° to about 70°.

Figure 3:
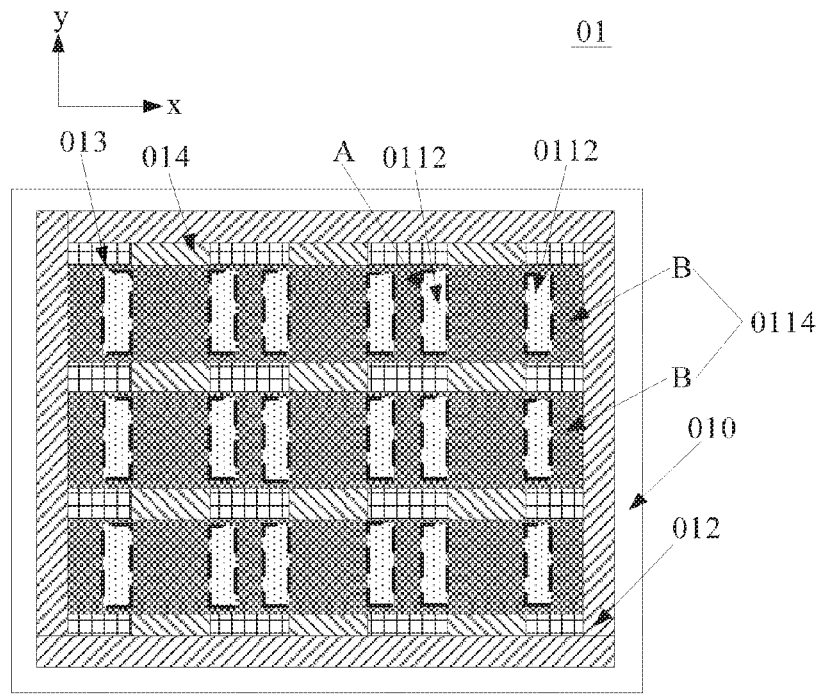
FIG. 3 is a plan view of a display substrate in some embodiments.

FIG. 3 is a plan view of a display substrate in some embodiments. Referring to FIG. 3, the display substrate 01 in the embodiment includes a plurality of pixels formed on a base substrate 010. Each pixel in FIG. 3 includes a color generating layer on the base substrate 010; a first reflective layer 0112 surrounding the color generating layer (e.g., on two sides or on all four sides) in plan view of the base substrate 010; a barrier layer on at least two opposite sides of the color generating layer in plan view of the base substrate 010, the barrier layer and the color generating layer spaced apart by the first reflective layer 0112; and a second reflective layer 0114 on a side the barrier layer distal to the base substrate 010, the second reflective layer 0114 and the color generating layer spaced apart by the barrier layer. In FIG. 3, the second reflective layer 0114 includes a plurality of horizontal reflective strips B, each of which between two horizontal black matrix strips. Each horizontal reflective strip B includes a light transmissive area A and a light reflective area in each pixel. The light transmissive area A corresponds to the first reflective layer 0112, the projection of the light transmissive area A on the base substrate 010 substantially overlaps with that of the first reflective layer 0112. Optionally, the projection of the light transmissive area A on the base substrate 010 is substantially within that of the first reflective layer 0112. The light reflective area corresponds to the color generating layer, the projection of the color generating layer on the base substrate 010 substantially overlaps with that of the light reflective area. Optionally, the projection of the color generating layer on the base substrate 010 is substantially within that of the light reflective area. In FIG. 3, the transparent electrode layer 014 includes a plurality of transparent electrodes. Optionally, the transparent electrode is a strip electrode (e.g., a strip electrode extending through a plurality of pixels). Optionally, the transparent electrodes are spaced apart by a plurality of vertical black matrix strips. Optionally, the length direction of the transparent electrodes is substantially perpendicular to the length direction of the horizontal reflective strip B. Optionally, the transparent electrodes are spaced apart by a plurality of horizontal black matrix strips. Optionally, the length direction of the transparent electrodes is substantially parallel to the length direction of the horizontal reflective strip B.

When a voltage potential is applied between the second reflective layer 0114 and the transparent electrode layer 014, the interaction between the second reflective layer 0114 and the transparent electrode layer 014 is determined by Coulomb force between the two. By adjusting the voltage difference between the second reflective layer 0114 and the transparent electrode layer 014, the gray level gradient of the image can be accordingly adjusted. Optionally, a first voltage in one direction of polarity is applied to the second reflective layer 0114 (e.g., a voltage of +10 V) and a second voltage in an opposite direction of polarity is applied to the transparent electrode layer 014 (e.g., a voltage of −10 V), the second reflective layer 0114 and the transparent electrode layer 014 have opposite charge, in this case, an attractive coulomb force is formed between the two, drawing a portion of the second reflective layer 0114 corresponding to the transparent electrode layer 014 towards the transparent electrode layer 014. When the portion of the second reflective layer 0114 corresponding to the transparent electrode layer 014 is drawn to a position in close proximity to the color generating layer 0111 (which covers a corresponding portion of transparent electrode layer 014), the color generation layer 0111 is turned off. When the voltages on the second reflective layer 0114 and the transparent electrode layer 014 are withdrawn or reduced, the portion of the second reflective layer 0114 corresponding to the transparent electrode layer 014 recovers from the attracted state and moves away from the color generating layer 0111, the color generating layer 0111 is turned on again. Optionally, voltages of a same direction of polarity may be applied to both the second reflective layer 0114 and the transparent electrode layer 014 (e.g., both applied with a voltage of +10 V) to turn on the color generating layer 0111 with a shorter response time. In this case, a repulsive coulomb force is formed between the second reflective layer 0114 and the transparent electrode layer 014. The two layers repel each other, moving the portion of the second reflective layer 0114 corresponding to the transparent electrode layer 014 away from the transparent electrode layer 014. The color generating layer 0111 is turned on again. The present display substrate utilizes the coulomb force for turning on and off the color generating layer 0111, a highly reliable control of the color generating layer 0111 can be achieved.

Figure 4:
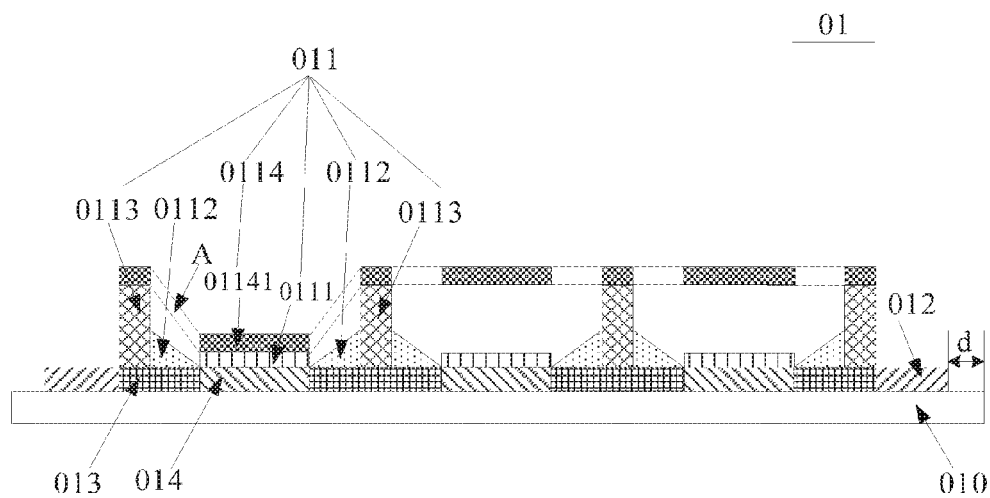
FIG. 4 is a diagram illustrating the structure of a display substrate having a voltage applied to the display substrate in some embodiments.

FIG. 4 is a diagram illustrating the structure of a display substrate having a voltage applied to the display substrate in some embodiments. Referring to FIG. 4, a first voltage in one direction of polarity is applied to the second reflective layer 0114 on the left side and a second voltage in an opposite direction of polarity is applied to the transparent electrode layer 014 on the left side. The color generating layer 0111 on the left side is turned off. Other color generating layers 0111 in the display substrate remain turned-on.

Based on the above, the present disclosure provides a display substrate having a plurality of pixels, each of which includes a hollow chamber O formed by a color generating layer, a first reflective layer, a barrier layer and a second reflective layer. The display substrate is assembled with a backlight module to form a display panel. In the display panel, light provided by the backlight module enters into the hollow chamber O through a light transmissive area A in the second reflective layer. The light is reflected by the first reflective layer 0112 and the second reflective layer 0114, and exits the hollow chamber O through the color generating layer 0111. Accordingly, the present display panel does not require a liquid crystal layer or a polarizer. Light absorption by the liquid crystal layer and the polarizer is avoided in the present display panel. Thus, loss of light illuminance and energy is minimized in the present display panel and display apparatus.

In another aspect, the present disclosure provides a method of fabricating a display substrate (e.g., a display substrate of FIG. 1 or FIG. 2). The display substrate includes a base substrate. The base substrate may be made of any appropriate material, e.g., a solid, non-metal transparent material such as glass, quartz, and a transparent resin.

In some embodiments, the method includes forming at least one pixel on the base substrate within the display region of the display substrate. Optionally, each pixel in the embodiment includes a color generating layer on the base substrate; a first reflective layer surrounding the color generating layer (e.g., on two sides or on all four sides) in plan view of the base substrate; a barrier layer on at least two opposite sides of the color generating layer in plan view of the base substrate, the barrier layer and the color generating layer spaced apart by the first reflective layer; and a second reflective layer on a side the barrier layer distal to the base substrate, the second reflective layer and the color generating layer spaced apart by the barrier layer.

In some embodiments, the second reflective layer includes at least one light transmissive area A and a light reflective area. The light transmissive area A corresponds to the first reflective layer, the projection of the light transmissive area A on the base substrate substantially overlaps with that of the first reflective layer. Optionally, the projection of the light transmissive area A on the base substrate is substantially within that of the first reflective layer. The light reflective area corresponds to the color generating layer, the projection of the color generating layer on the base substrate substantially overlaps with that of the light reflective area. Optionally, the projection of the color generating layer on the base substrate is substantially within that of the light reflective area.

In each pixel, the color generating layer, the first reflective layer, the barrier layer, and the second reflective layer form a hollow chamber O.

In some embodiments, prior to forming the at least one pixel, the method includes forming a light condensing layer in a peripheral region (e.g., a non-display region) of the display substrate.

In some embodiments, prior to forming the at least one pixel, the method includes forming a black matrix array having a plurality of spaced-apart horizontal black matrix strips and a plurality of spaced-apart vertical black matrix strips intersecting each other in a same layer. The plurality of horizontal black matrix strips and the plurality of vertical black matrix strips divide the display region of the display substrate into a plurality of open areas. Optionally, the method further includes forming a transparent electrode layer within the open areas.

In some embodiments, the method further includes forming the at least one pixel in the display region of the display substrate. Optionally, the step of forming the at least one pixel includes forming a color generating layer on a side of the transparent electrode layer distal to the base substrate; forming a first reflective layer on a side of the black matrix array distal to the base substrate; and forming a barrier layer on a side of the black matrix array distal to the base substrate. The first reflective layer surrounds the color generating layer (e.g., on two sides or on all four sides) in plan view of the base substrate. The barrier layer is on at least two opposite sides of the color generating layer in plan view of the base substrate, and the barrier layer and the color generating layer are spaced apart by the first reflective layer. Optionally, the barrier layer and the first reflective layer are formed on the plurality of vertical black matrix strips. Optionally, the barrier layer and the first reflective layer are formed on the plurality of horizontal black matrix strips. Optionally, the barrier layer and the first reflective layer are formed on both the plurality of vertical black matrix strips and the plurality of horizontal black matrix strips.

In some embodiments, the step of forming the at least one pixel further includes forming a sacrifice layer on a side of the color generating layer and the first reflective layer distal to the base substrate within the display region; and forming a second reflective layer on a side of the sacrifice layer distal to the base substrate. Optionally, the sacrifice layer is formed in areas other than those occupied by the barrier layer. Optionally, the sacrifice layer is limited to areas corresponding to the color generating layer and the first reflective layer, and the area of the sacrifice layer is substantially the same as the combined areas of the color generating layer and the first reflective layer.

In some embodiments, the step of forming the second reflective layer includes forming a second reflective material layer on a side of the sacrifice layer distal to the base substrate. Optionally, the step further includes forming at least one light transmissive area and a light reflective area in the second reflective material layer thereby forming the second reflective layer. The light transmissive area corresponds to the first reflective layer, the projection of the light transmissive area on the base substrate substantially overlaps with that of the first reflective layer. Optionally, the projection of the light transmissive area on the base substrate is substantially within that of the first reflective layer. The light reflective area corresponds to the color generating layer, the projection of the color generating layer on the base substrate substantially overlaps with that of the light reflective area. Optionally, the projection of the color generating layer on the base substrate is substantially within that of the light reflective area.

In some embodiments, the method further includes removing the sacrifice layer thereby forming a hollow chamber surrounded by the color generating layer, the first reflective layer, the barrier layer, and the second reflective layer.

In some embodiments, the step of forming the second reflective layer includes forming a plurality of reflective strips, and forming at least one light transmissive area and a light reflective area in each reflective strip. Optionally, the plurality of reflective strips is a plurality of horizontal reflective strips. Optionally, the plurality of reflective strips is a plurality of vertical reflective strips.

Optionally, the transparent electrode is a strip electrode (e.g., a strip electrode extending through a plurality of pixels). Optionally, the transparent electrodes are spaced apart by a plurality of vertical black matrix strips. Optionally, the length direction of the transparent electrodes is substantially perpendicular to the length direction of a horizontal reflective strip. Optionally, the transparent electrodes are spaced apart by a plurality of horizontal black matrix strips. Optionally, the length direction of the transparent electrodes is substantially parallel to the length direction of a horizontal reflective strip.

Optionally, the first reflective layer is formed on the plurality of vertical black matrix strips, one rectangular side of the first reflective layer is in contact with the vertical black matrix strips, and the rectangular side M forms an angle with the vertical black matrix strips in the range of about 20° to about 70°.

Optionally, the first reflective layer is formed on the plurality of horizontal black matrix strips, one rectangular side of the first reflective layer is in contact with the horizontal black matrix strips, and the rectangular side M forms an angle with the horizontal black matrix strips in the range of about 20° to about 70°.

Optionally, the first reflective layer is formed in a patterning process (e.g., a single patterning process). Optionally, the reflective layer and the barrier layer are made of resin materials, and patterned by, e.g., exposure and developing processes. Optionally, the second reflective layer is a reflective film made of a reflective material.

Based on the above, the present disclosure provides a method of fabricating a display substrate. The display substrate fabricated by the present method includes a plurality of pixels, each of which includes a hollow chamber formed by a color generating layer, a first reflective layer, a barrier layer and a second reflective layer. The display substrate is assembled with a backlight module to form a display panel. In the display panel, light provided by the backlight module enters into the hollow chamber through a light transmissive area in the second reflective layer. The light is reflected by the first reflective layer and the second reflective layer, and exits the hollow chamber through the color generating layer. Accordingly, the present display panel does not require a liquid crystal layer or a polarizer. Light absorption by the liquid crystal layer and the polarizer is avoided in the present display panel. Thus, loss of light illuminance and energy is minimized in the present display panel and display apparatus.

In some embodiments, the method of fabricating a display substrate includes forming a light condensing layer in a peripheral region of the display substrate; forming a black matrix array having a plurality of spaced-apart horizontal black matrix strips and a plurality of spaced-apart vertical black matrix strips intersecting each other in a same layer, the plurality of spaced-apart horizontal black matrix strips and the plurality of spaced-apart vertical black matrix strips dividing the display region of the display substrate into a plurality of open areas; forming a transparent electrode layer within the plurality of open areas; and forming at least one pixel on a base substrate subsequent to the formation of the black matrix array and the transparent electrode layer on the base substrate. The base substrate may be made of any appropriate material, e.g., a solid, non-metal transparent material such as glass, quartz, and a transparent resin.

Figure 5:
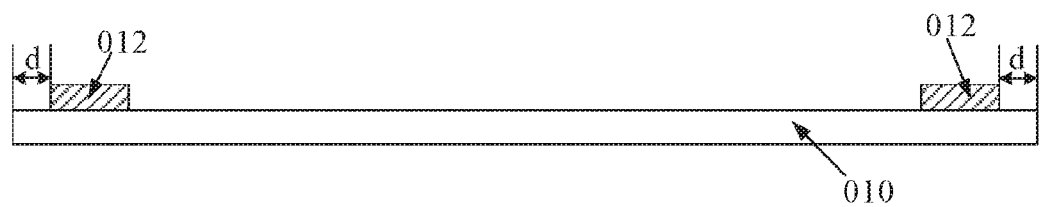
FIG. 5 is a diagram illustrating the formation of a light condensing layer in the peripheral region of a display substrate in some embodiments.

In some embodiments, the method includes forming a light condensing layer in a peripheral region (e.g., a non-display region) of the display substrate. FIG. 5 is a diagram illustrating the formation of a light condensing layer in the peripheral region of a display substrate in some embodiments. Referring to FIG. 5, the light condensing layer in the embodiment may be made of any appropriate material such as a resin material, and may have any appropriate width and/or thickness suitable for a particular design. Optionally, the light condensing layer has a width of about 5 mm. As defined herein, the term "width of the light condensing layer" refers to a distance between a first side of the light condensing layer proximal to the barrier layer and a second side of the light condensing layer distal to the barrier layer. Optionally, a space on the base substrate on a side of the light condensing layer distal to the barrier layer is reserved for receiving a backlight module during assembly of the display panel. Optionally, the space has a width of d (see, e.g., FIG. 5).

Any appropriate method may be used for forming the light condensing layer. Examples of such methods include, but are not limited to, coating, magnetron sputtering, and vapor deposition such as plasma enhanced chemical vapor deposition (PEVCD). Optionally, the method includes forming a resin layer on the base substrate 010, exposing the resin layer using a mask plate thereby forming an exposed region and a non-exposed region, developing the exposed resin layer, removing the resin material within the exposed region whereas the resin material within the non-exposed region remains, and baking the developed resin layer thereby forming the light condensing layer 012. Optionally, the resin layer is made of a positive photoresist resin material. Optionally, the resin layer is made of a negative photoresist resin material.

Figure 6:
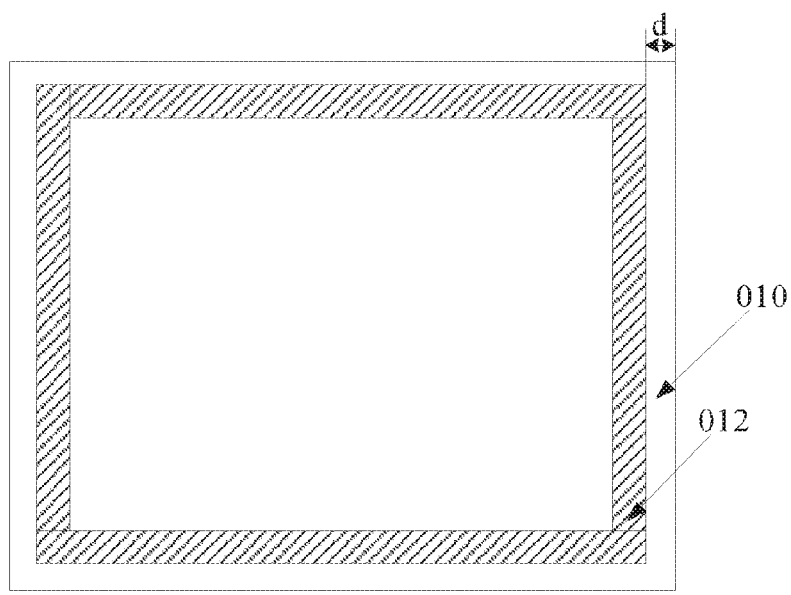
FIG. 6 is a plan view of a display substrate having a light condensing layer formed in a peripheral region in some embodiments.

FIG. 6 is a plan view of a display substrate having a light condensing layer formed in a peripheral region in some embodiments. Referring to FIG. 6, the light condensing layer 012 is formed in a peripheral region (e.g., a non-display region) of the display substrate 010. A space having a width of d on the base substrate on a side of the light condensing layer distal to the barrier layer is reserved for receiving a backlight module during assembly of the display panel.

In some embodiments, the method of fabricating the display substrate also includes forming a black matrix array having a plurality of spaced-apart horizontal black matrix strips and a plurality of spaced-apart vertical black matrix strips intersecting each other in a same layer. The plurality of spaced-apart horizontal black matrix strips and the plurality of spaced-apart vertical black matrix strips divide the display region of the display substrate into a plurality of open areas.

Figure 7:
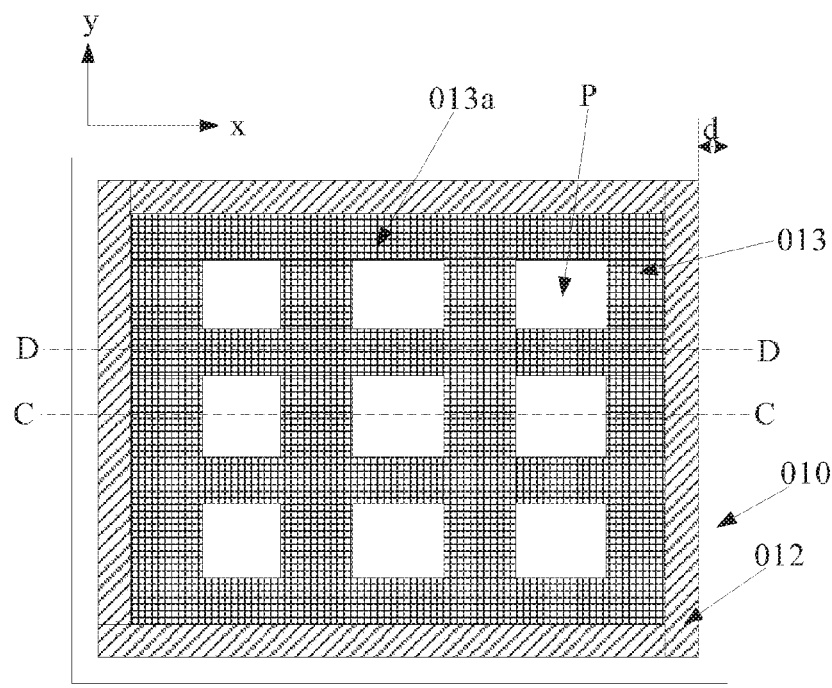
FIG. 7 is a plan view of a display substrate having a black matrix array and a light condensing layer in a peripheral region in some embodiments.

The display region is the region of the display substrate outside the peripheral region. FIG. 7 is a plan view of a display substrate having a black matrix array and a light condensing layer 012 in a peripheral region in some embodiments, the black matrix array is formed subsequent to the formation of the light condensing layer 012 in FIG. 7. In the display region of the display substrate, the black matrix array includes a plurality of spaced-apart horizontal black matrix strips 013*a* and a plurality of spaced-apart vertical black matrix strips 013 intersecting each other in a same layer. The plurality of spaced-apart horizontal black matrix strips 013*a* and the plurality of spaced-apart vertical black matrix strips 013 divide the display region of the display substrate into a plurality of open areas P.

Figure 8:
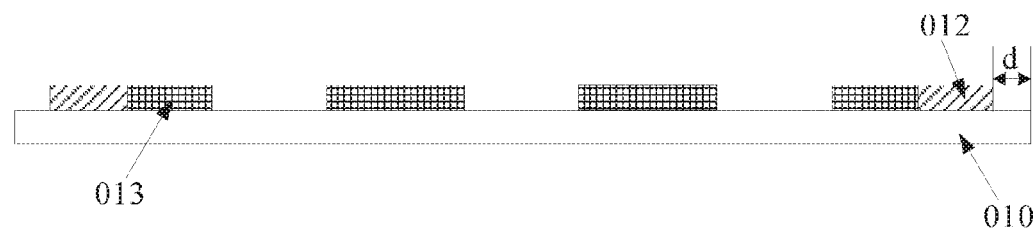
FIG. 8 is a cross-sectional view along the C-C direction of the display substrate in FIG. 7.
Figure 9:
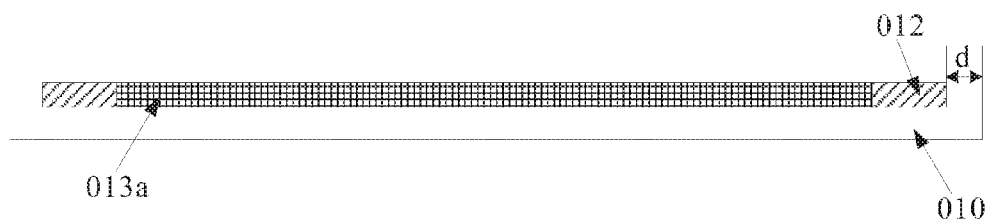
FIG. 9 is a cross-sectional view along the D-D direction of the display substrate in FIG. 7.

FIG. 8 is a cross-sectional view along the C-C direction of the display substrate in FIG. 7. Referring to FIG. 8, the display substrate includes a plurality of spaced-apart vertical black matrix strips 013 in the display region on the base substrate 010. FIG. 9 is a cross-sectional view along the D-D direction of the display substrate in FIG. 7. Referring to FIG. 9, the display substrate includes a plurality of spaced-apart horizontal black matrix strips 013*a* in the display region on the base substrate 010.

Optionally, the plurality of spaced-apart horizontal black matrix strips 013*a* and the plurality of spaced-apart vertical black matrix strips 013 are formed in a single patterning process. Any appropriate method may be used for forming the black matrix array. Examples of such methods include, but are not limited to, coating, magnetron sputtering, and vapor deposition such as plasma enhanced chemical vapor deposition (PEVCD). Optionally, the method includes forming a black resin material layer on a base substrate 010 having a light condensing layer 012, exposing the black resin material layer using a mask plate thereby forming an exposed region and a non-exposed region, developing the exposed black resin material layer, removing the black resin material within the exposed region whereas the black resin material within the non-exposed region remains, and baking the developed black resin material layer thereby forming the black matrix array. The exposed region corresponds to the open areas P. Optionally, the resin layer is made of a positive photoresist black resin material. Optionally, the resin layer is made of a negative photoresist black resin material.

Figure 10:
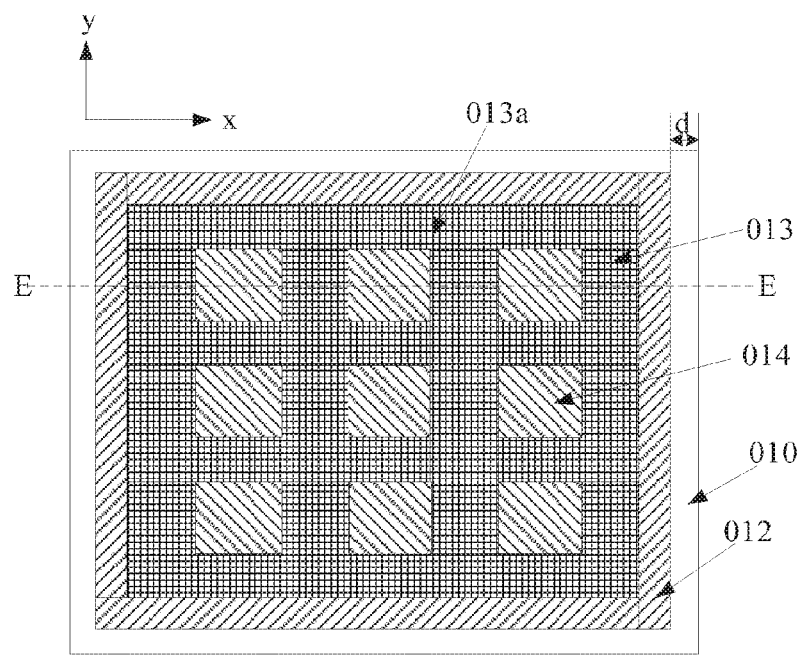
FIG. 10 is a plan view of a display substrate having a transparent electrode layer formed in the open areas of the display substrate in some embodiments.

In some embodiments, the method of fabricating the display substrate also includes forming a transparent electrode layer 014 within the open areas. FIG. 10 is a plan view of a display substrate having a transparent electrode layer 014 formed within the open areas of the display substrate in some embodiments. Referring to FIG. 10, the transparent electrode layer 014 includes a plurality of transparent electrodes, each of which is within an open area form by the plurality of horizontal black matrix strips 013*a* and the plurality of vertical black matrix strips 013. Optionally, the transparent electrodes are block electrodes. Optionally, the block electrodes have a square shape.

Figure 11:
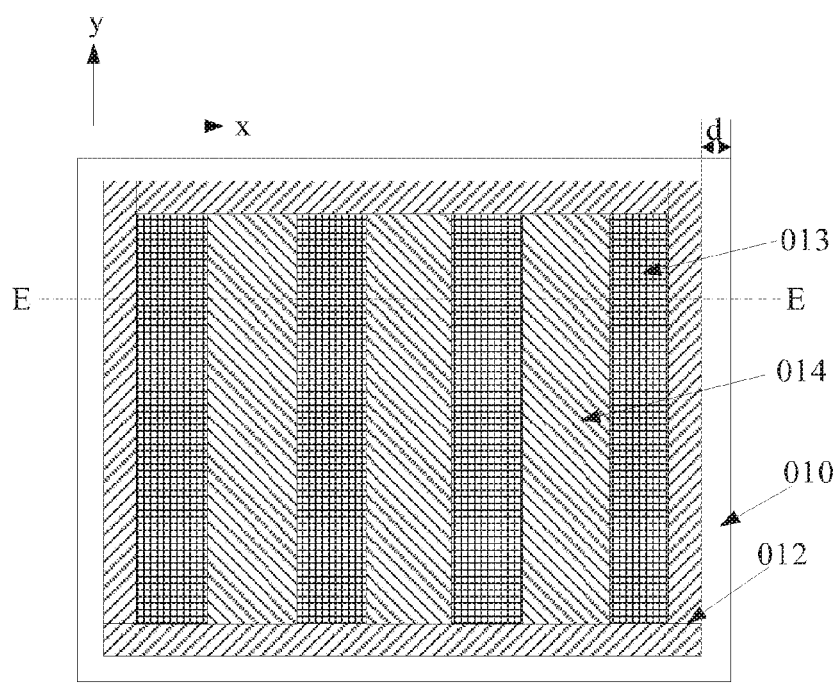
FIG. 11 is a plan view of a display substrate having a transparent electrode layer formed in the open areas of the display substrate in some embodiments.

FIG. 11 is a plan view of a display substrate having a transparent electrode layer 014 formed in the open areas of the display substrate in some embodiments. Referring to FIG. 11, the transparent electrode layer 014 includes a plurality of transparent electrodes, each of which is within an open area form by the plurality of vertical black matrix strips 013. The transparent electrodes in FIG. 11 are rod-shaped electrodes, each of which is spaced apart by two neighboring vertical black matrix strips 013. Optionally, the length direction of the transparent electrodes is substantially parallel to the length direction of each vertical black matrix strip 013 (e.g., they direction in FIG. 11). In some display substrates, the transparent electrodes are rod-shaped electrodes, each of which is spaced apart by two neighboring horizontal black matrix strips. Optionally, the length direction of the transparent electrodes is substantially parallel to the length direction of each horizontal black matrix strip.

Figure 12:
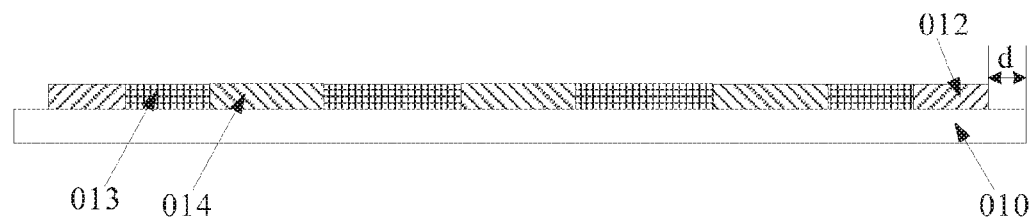
FIG. 12 is a cross-sectional view along the E-E direction of the display substrate in FIG. 10 or FIG. 11.

FIG. 12 is a cross-sectional view along the E-E direction of the display substrate in FIG. 10 or FIG. 11. Referring to FIG. 12, the display substrate includes a transparent electrode within each open area between two neighboring vertical black matrix strips 013. Any appropriate material (e.g., indium tin oxide) and method may be used for forming the transparent electrode layer 014. Examples of such methods include, but are not limited to, coating, magnetron sputtering, and vapor deposition such as plasma enhanced chemical vapor deposition (PEVCD). Optionally, the method includes forming a transparent conductive material layer (e.g., an indium tin oxide layer) on the base substrate 010, forming a photoresist layer on the transparent conductive material layer, exposing the photoresist layer using a mask plate, developing the exposed photoresist layer thereby forming a photoresist pattern corresponding to the transparent electrode layer pattern, etching and removing the transparent conductive material in regions not covered by the photoresist layer thereby forming the transparent electrode layer 014.

In some embodiments, the method of fabricating a display substrate further includes forming at least one pixel on the base substrate subsequent to the formation of the black matrix array and the transparent electrode layer on the base substrate. Optionally, each pixel in the embodiment includes a color generating layer on the base substrate; a first reflective layer surrounding the color generating layer (e.g., on two sides or on all four sides) in plan view of the base substrate; a barrier layer on at least two opposite sides of the color generating layer in plan view of the base substrate, the barrier layer and the color generating layer spaced apart by the first reflective layer; and a second reflective layer on a side the barrier layer distal to the base substrate, the second reflective layer and the color generating layer spaced apart by the barrier layer.

In some embodiments, the second reflective layer includes at least one light transmissive area and a light reflective area. The light transmissive area corresponds to the first reflective layer, the projection of the light transmissive area on the base substrate substantially overlaps with that of the first reflective layer. Optionally, the projection of the light transmissive area on the base substrate is substantially within that of the first reflective layer. The light reflective area corresponds to the color generating layer, the projection of the color generating layer on the base substrate substantially overlaps with that of the light reflective area. Optionally, the projection of the color generating layer on the base substrate is substantially within that of the light reflective area.

In each pixel, the color generating layer, the first reflective layer, the barrier layer, and the second reflective layer form a hollow chamber. Thus, prior to forming the pixel, the method includes forming a color generating layer, a first reflective layer, a barrier layer, and a second reflective layer, respectively.

In some embodiments, the present disclosure provides a method of fabricating pixels on a display substrate having a black matrix and a transparent electrode layer. Optionally, the method includes forming a color generating layer on a side of the transparent electrode layer distal to the base substrate within each pixel; forming a first reflective layer on a side of the black matrix array distal to the base substrate, the first reflective layer surrounding the color generating layer (e.g., on two sides or on four side) in plan view of the base substrate; forming a barrier layer on a side of the black matrix array distal to the base substrate. The barrier layer is on at least two opposite sides of the color generating layer in plan view of the base substrate, and the barrier layer and the color generating layer are spaced apart by the first reflective layer; forming a sacrifice layer on a side of the color generating layer distal to the base substrate within the display region; forming a second reflective layer on a side of the sacrifice layer and the barrier layer distal to the base substrate; forming at least one light transmissive area and a light reflective area in the reflective material layer thereby forming the second reflective layer; and moving the sacrifice layer, thereby forming a hollow chamber surrounded by the color generating layer, the first reflective layer, the barrier layer, and the second reflective layer.

Figure 13:
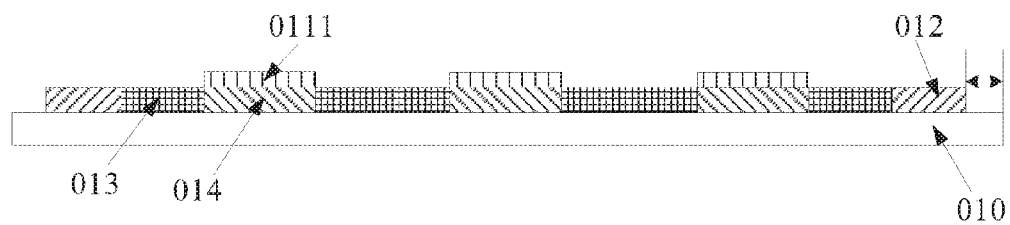
FIG. 13 is a diagram illustrating the structure of a display substrate having a color generating layer and a transparent electrode layer in some embodiments.

FIG. 13 is a diagram illustrating the structure of a display substrate having a color generating layer 0111 and a transparent electrode layer 014 in some embodiments. Optionally, the color generating layer 0111 is a color filter layer comprising a plurality of color filters such as a red color filter, a green color filter, a blue color filter and a yellow color filter.

Figure 14:
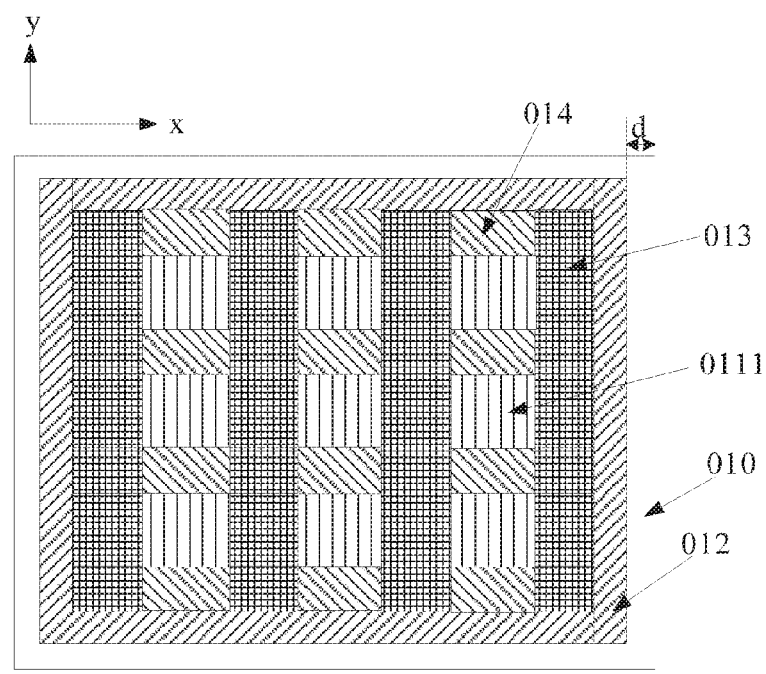
FIG. 14 is a plan view of a display substrate having a color generating layer and a transparent electrode layer in some embodiments.

FIG. 14 is a plan view of a display substrate having a color generating layer 0111 and a transparent electrode layer 014 in some embodiments. Referring to FIG. 14, a plurality of color filters along the y-direction on the transparent electrode layer 014 are pixels of a same color. For example, the plurality of color filters along the y-direction on the left side of the display substrate may be all red pixels. Three color filters along the x-direction on the transparent electrode layer 014 may be a red pixel, a green pixel and a blue pixel.

Any appropriate material (e.g., a resin material) and method may be used for forming the color generating layer. Examples of such methods include, but are not limited to, coating, magnetron sputtering, and vapor deposition such as plasma enhanced chemical vapor deposition (PEVCD). For example, for forming a red pixel, the method may include forming a red resin layer on the base substrate 010, exposing the red resin layer using a mask plate thereby forming an exposed region and a non-exposed region, developing the exposed red resin layer, removing the red resin material within the exposed region whereas the red resin material within the non-exposed region remains, and baking the developed red resin layer thereby forming the red color filter corresponding to the red pixel. Other pixels such as a green pixel, a blue pixel, a white pixel, and a yellow pixel may be formed by a similar process. The color generating layer 0111 may have any appropriate thickness suitable for a particular design. Optionally, the resin layer is made of a positive photoresist resin material. Optionally, the resin layer is made of a negative photoresist resin material.

In some embodiments, the method of fabricating a pixel further includes forming a first reflective layer on a side of the black matrix array distal to the base substrate, the first reflective layer surrounding the color generating layer (e.g., on two sides or on four side) in plan view of the base substrate.

Figure 15:
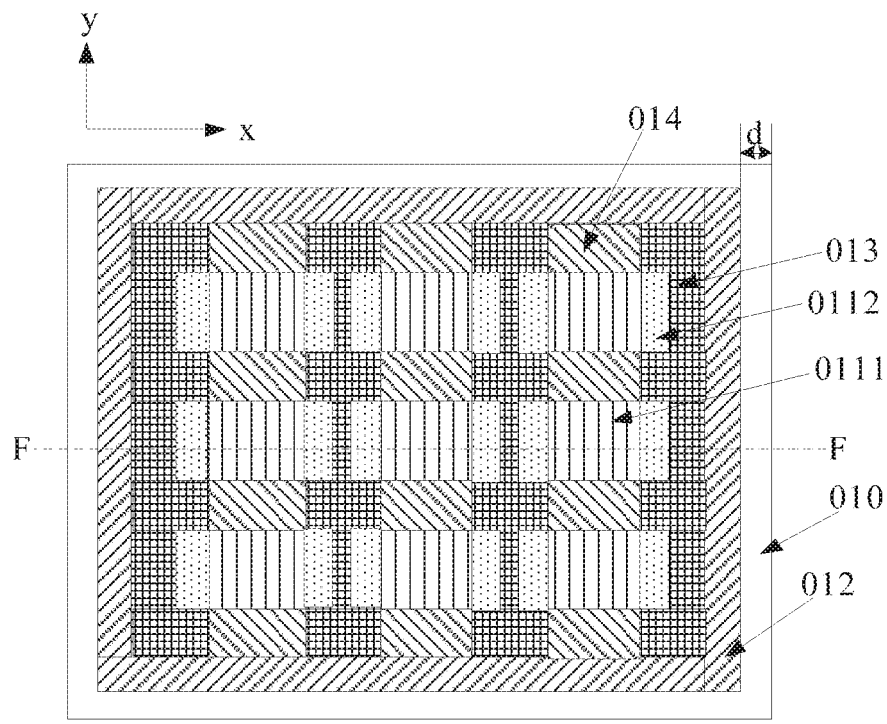
FIG. 15 is a plan view of a display substrate having a first reflective layer on the vertical black matrix strips in some embodiments.

FIG. 15 is a plan view of a display substrate having a first reflective layer 0112 on the vertical black matrix strips 013 within each pixel in some embodiments. Referring to FIG. 15, the display substrate in the embodiment includes a first reflective layer 0112 on the vertical black matrix strips 013, the first reflective layer 0112 surrounding the color generating layer 0111 on two sides of the color generating layer 0111 in plan view of the base substrate.

Figure 16:
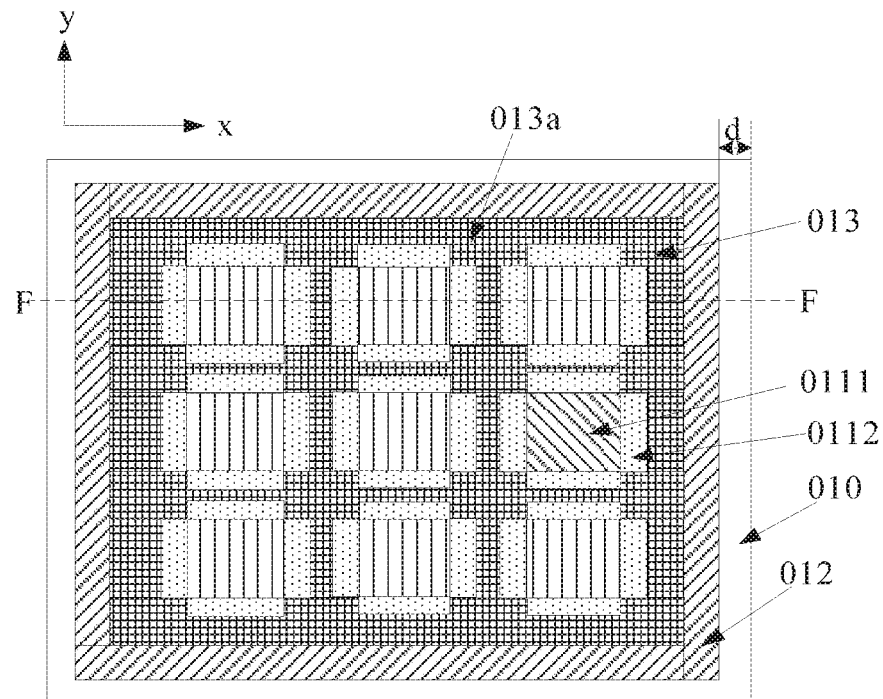
FIG. 16 is a plan view of a display substrate having a first reflective layer on both the vertical black matrix strips and the horizontal black matrix strips in some embodiments.

In FIG. 15, the transparent electrodes in the transparent electrode layer 014 are strip electrodes (e.g., a strip electrode extending through a plurality of pixels). The transparent electrodes are between two neighboring vertical black matrix strips 013. Optionally, the transparent electrodes in the transparent electrode layer 014 are strip electrodes (e.g., a strip electrode extending through a plurality of pixels), and the transparent electrodes are between two neighboring horizontal black matrix strips 013a. In that case, the first reflective layer 0112 may be formed on the horizontal black matrix strips 013a, the first reflective layer 0112 surrounding the color generating layer 0111 on two sides of the color generating layer 0111 in plan view of the base substrate. Optionally, the transparent electrodes in the transparent electrode layer 014 are block electrodes (e.g., square-shaped electrodes), and the first reflective layer 0112 may be formed on both the vertical black matrix strips 013 and the horizontal black matrix strips 013a. FIG. 16 is a plan view of a display substrate having a first reflective layer 0112 on both the vertical black matrix strips 013 and the horizontal black matrix strips 013a in some embodiments. Referring to FIG. 16, the first reflective layer 0112 surrounds the color generating layer 0111 on all four sides of the color generating layer 0111 in plan view of the base substrate.

Figure 17:
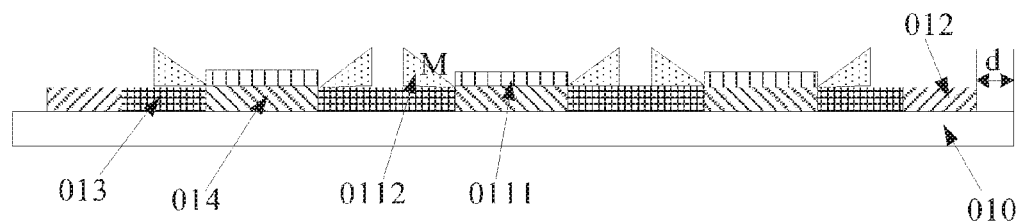
FIG. 17 is a cross-sectional view along the F-F direction of the display substrate in FIG. 15 or FIG. 16.

FIG. 17 is a cross-sectional view along the F-F direction of the display substrate in FIG. 15 or FIG. 16. Referring to FIG. 17, the first reflective layer 0112 includes a plurality of triangular prisms (e.g., 2 or 4 triangular prisms) in each pixel, each of which abutting a side of the color generating layer 0111. Optionally, each triangular prism of the first reflective layer 0112 includes a rectangular side in contact with the black matrix array (either the vertical black matrix strips 013 or the horizontal black matrix strips 013a or both). Each triangular prism also includes two other rectangular sides, one of which is proximal to the color generating layer 0111. Optionally, each triangular prism of the first reflective layer 0112 includes a reflective film over the proximal rectangular side, e.g., a reflective metal film such as an aluminum film or an aluminum alloy film over the proximal rectangular side of each triangular prism. Optionally, the first reflective layer is formed on the plurality of vertical black matrix strips, the rectangular side having the reflective film forms an angle with the vertical black matrix strips in the range of about 20° to about 70°. Optionally, the first reflective layer is formed on the plurality of horizontal black matrix strips, the rectangular side having the reflective film forms an angle with the horizontal black matrix strips in the range of about 20° to about 70°. Optionally, the triangular prism is a right triangular prism having two other rectangular sides perpendicular to each other, one of which is in contact with the black matrix array.

Any appropriate method may be used for forming the first reflective layer 0112. Examples of such methods include, but are not limited to, coating, magnetron sputtering, and vapor deposition such as plasma enhanced chemical vapor deposition (PEVCD). In some embodiments, the first reflective layer 0112 is formed in a two-step patterning process. Optionally, the method includes forming an over cover layer on the base substrate 010 using an organic resin material, exposing and developing the over cover layer thereby forming a triangular prism resin layer, one rectangular side of which is in contact with the black matrix array. Optionally, the method also includes forming reflective film over the proximal rectangular side, e.g., a reflective metal film such as an aluminum film or an aluminum alloy film over the proximal rectangular side of each triangular prism, thereby forming the first reflective layer 0112. In some embodiments, the first reflective layer 0112 is formed in a single patterning process. Optionally, the method includes depositing a reflective material layer (e.g., a reflective metal film such as an aluminum film or an aluminum alloy film) on a base substrate having the color generating layer 011 by, e.g., coating, magnetron sputtering, and vapor deposition such as plasma enhanced chemical vapor deposition (PEVCD), forming a photoresist layer on the reflective material layer, exposing and developing the photoresist layer, etching and removing the reflective material layer thereby forming the first reflective layer 0112.

In some embodiments, the method of fabricating a pixel further includes forming a barrier layer on a side of the black matrix array distal to the base substrate. The barrier layer is on at least two opposite sides of the color generating layer in plan view of the base substrate, and the barrier layer and the color generating layer are spaced apart by the first reflective layer.

Figure 18:
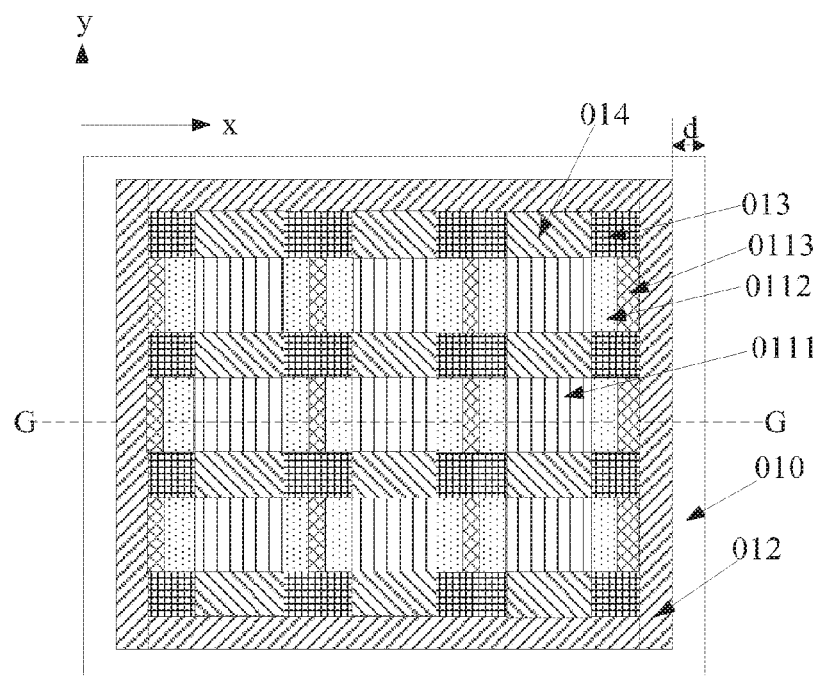
FIG. 18 is a plan view of a display substrate having a barrier layer and a first reflective layer on each vertical black matrix strip in some embodiments.

FIG. 18 is a plan view of a display substrate having a barrier layer 0113 and a first reflective layer 0112 on each vertical black matrix strip 013 in some embodiments. Referring to FIG. 18, the barrier layer 0113 is on at least two opposite sides of the color generating layer 0111 in plan view of the base substrate, and the barrier layer 0113 and the color generating layer 0111 are spaced apart by the first reflective layer 0112. In FIG. 18, the barrier layer 0113 and the first reflective layer 0112 are formed on the plurality of vertical black matrix strips 013.

Figure 19:
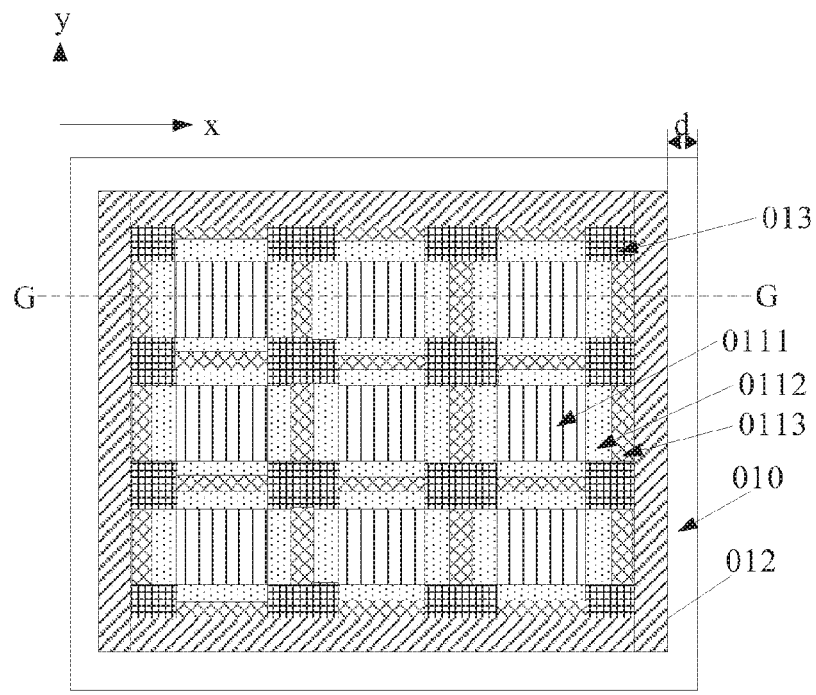
FIG. 19 is a plan view of a display substrate having a barrier layer and a first reflective layer on each vertical black matrix strip and each horizontal black matrix strip in some embodiments.

In FIG. 18, the transparent electrodes in the transparent electrode layer 014 are strip electrodes (e.g., a strip electrode extending through a plurality of pixels). The transparent electrodes are between two neighboring vertical black matrix strips 013. In FIG. 18, the barrier layer 0113 and the first reflective layer 0112 are formed on the vertical black matrix strips 013, the barrier layer 0113 on two opposite sides of the color generating layer 0111 in plan view of the base substrate, the barrier layer 0113 and the color generating layer 0111 spaced apart by the first reflective layer 0112. In some embodiments, the transparent electrodes in the transparent electrode layer 014 are strip electrodes (e.g., a strip electrode extending through a plurality of pixels), and the transparent electrodes are between two neighboring horizontal black matrix strips 013a, In that case, the barrier layer 0113 and the first reflective layer 0112 may be formed on the horizontal black matrix strips 013a, the barrier layer 0113 on two opposite sides of the color generating layer 0111 in plan view of the base substrate, the barrier layer 0113 and the color generating layer 0111 spaced apart by the first reflective layer 0112. In some embodiments, the transparent electrodes in the transparent electrode layer 014 are block electrodes (e.g., square-shaped electrodes), and the barrier layer 0113 and the first reflective layer 0112 may be formed on both the vertical black matrix strips 013 and the horizontal black matrix strips 013a. FIG. 19 is a plan view of a display substrate having a barrier layer 0113 and a first reflective layer 0112 on each vertical black matrix strip 013 and each horizontal black matrix strip 013a in some embodiments. Referring to FIG. 19, the barrier layer 0113 the first reflective layer 0112 surrounds the color generating layer 0111 on all four sides of the color generating layer 0111 in plan view of the base substrate, the barrier layer 0113 and the color generating layer 0111 spaced apart by the first reflective layer 0112.

Figure 20:
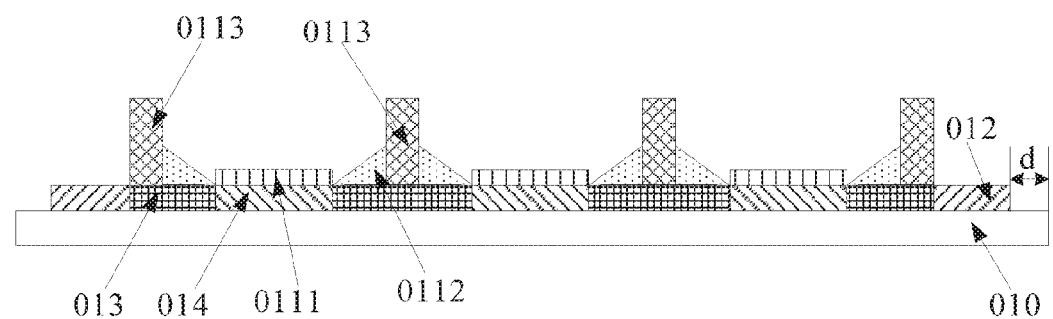
FIG. 20 is a cross-sectional view along the G-G direction of the display substrate in FIG. 18 or FIG. 19.

FIG. 20 is a cross-sectional view along the G-G direction of the display substrate in FIG. 18 or FIG. 19. Referring to FIG. 20, the barrier layer 0113 is formed on each vertical black matrix strips 013, and the barrier layer 0113 has a thickness larger than that of the first reflective layer 0112. By having this design, a hollow chamber may be formed by the color generating layer 0111, the first reflective layer 0112, the barrier layer 0113, and the second reflective layer 0114. Any appropriate material (e.g., a resin material) and method may be used for forming the light condensing layer. Examples of such methods include, but are not limited to, coating, magnetron sputtering, and vapor deposition such as plasma enhanced chemical vapor deposition (PEVCD). Optionally, the method includes forming a resin layer on the base substrate 010 subsequent to the formation of the first reflective layer 012, exposing the resin layer using a mask plate thereby forming an exposed region and a non-exposed region, developing the exposed resin layer, removing the resin material within the exposed region whereas the resin material within the non-exposed region remains, and baking the developed resin layer thereby forming the barrier layer 0113. Optionally, the resin layer is made of a positive photoresist resin material. Optionally, the resin layer is made of a negative photoresist resin material. Optionally, the barrier layer 0113 and the first reflective layer 012 are formed in a same layer. Optionally, the barrier layer 0113 and the first reflective layer 012 are formed in different layers.

In some embodiments, the method of fabricating a pixel further includes forming a sacrifice layer on a side of the color generating layer distal to the base substrate within the display region. Optionally, the sacrifice layer is formed in areas other than those occupied by the barrier layer.

Figure 21:
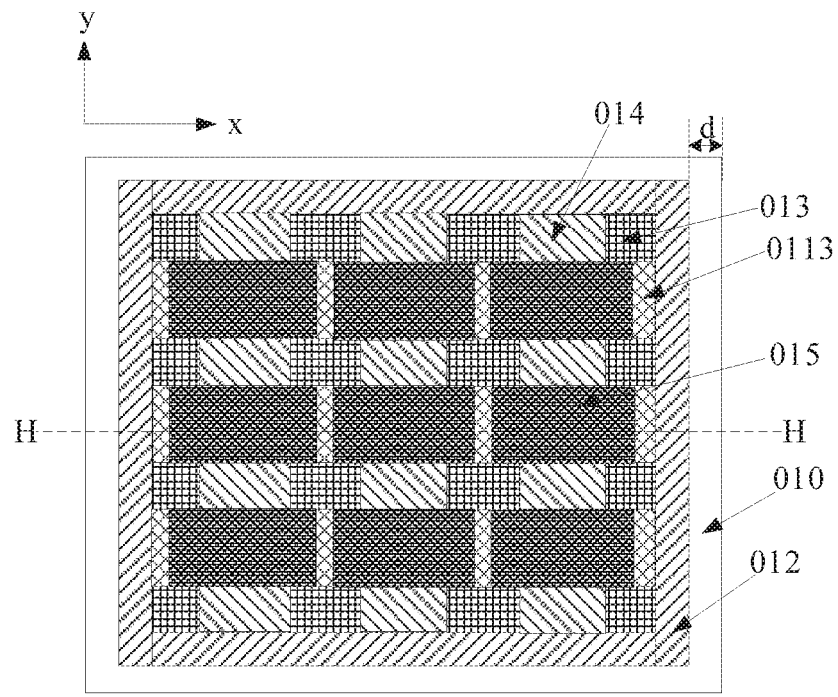
FIG. 21 is a diagram illustrating the structure of a display substrate having a sacrifice layer within areas defined by a barrier layer in some embodiments.

FIG. 21 is a diagram illustrating the structure of a display substrate having a sacrifice layer 015 within areas defined by a barrier layer 0113 in some embodiments. The sacrifice layer 015 is formed subsequent to the formation of the barrier layer 0113. The purpose of forming a sacrifice layer 015 is to form a hollow chamber in subsequent steps, the hollow chamber surrounded by the color generating layer 0111, the first reflective layer 0112, the barrier layer 0113, and the second reflective layer 0114. Referring to FIG. 21, the sacrifice layer 015 is formed on a side of the color generating layer 0111 and the first reflective layer 0112 distal to the base substrate 101, subsequent to the formation of a barrier layer 0113. Optionally, the sacrifice layer 015 is formed in areas other than those occupied by the barrier layer 0113. Optionally, the sacrifice layer 015 is limited to areas corresponding to the color generating layer 0111 and the first reflective layer 0112, and the area of the sacrifice layer 015 is substantially the same as the combined areas of the color generating layer 0111 and the first reflective layer 0112.

In FIG. 21, the transparent electrodes in the transparent electrode layer 014 are strip electrodes (e.g., a strip electrode extending through a plurality of pixels). The transparent electrodes are between two neighboring vertical black matrix strips 013. In FIG. 21, the sacrifice layer 015 is limited to areas corresponding to the color generating layer and the first reflective layer (as defined by the barrier layer 0113 on the vertical black matrix strips), and the area of the sacrifice layer 015 is substantially the same as the combined areas of the color generating layer and the first reflective layer.

In some embodiments, the transparent electrodes in the transparent electrode layer 014 are strip electrodes (e.g., a strip electrode extending through a plurality of pixels), and the transparent electrodes are between two neighboring horizontal black matrix strips. In that case, the sacrifice layer 015 is limited to areas corresponding to the color generating layer and the first reflective layer (as defined by the barrier layer 0113 on the horizontal black matrix strips), and the area of the sacrifice layer 015 is substantially the same as the combined areas of the color generating layer and the first reflective layer.

Figure 22:
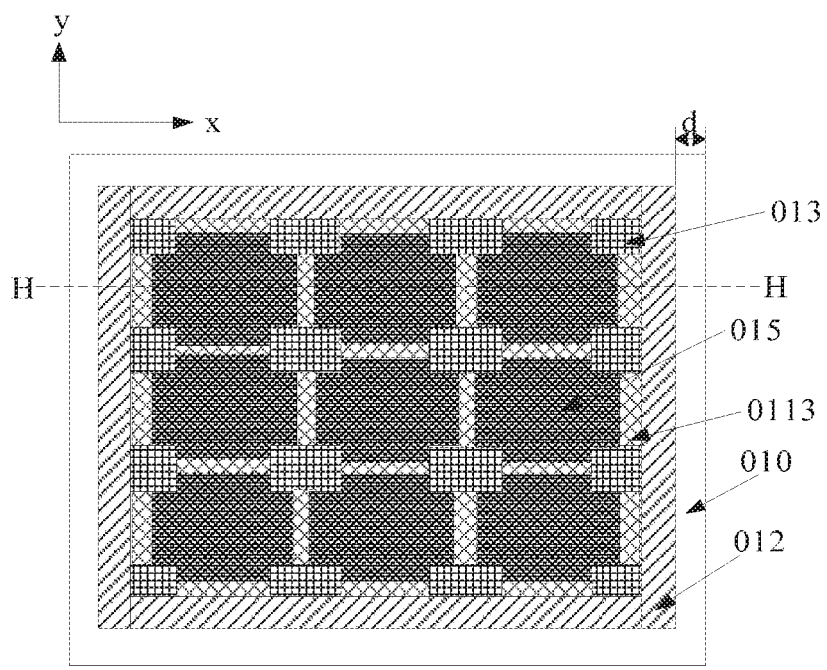
FIG. 22 is a diagram illustrating the structure of a display substrate having a sacrifice layer within areas defined by a barrier layer in some embodiments.

In some embodiments, the transparent electrodes in the transparent electrode layer 014 are block electrodes (e.g., square-shaped electrodes as shown in FIG. 10), and the barrier layer 0113 and the first reflective layer may be formed on both the vertical black matrix strips and the horizontal black matrix strips. FIG. 22 is a diagram illustrating the structure of a display substrate having a sacrifice layer 015 within areas defined by a barrier layer 0113 in some embodiments. Referring to FIG. 22, the first reflective layer is formed on both the vertical black matrix strips and the horizontal black matrix strips. The sacrifice layer 015 is limited to areas corresponding to the color generating layer and the first reflective layer (as defined by the barrier layer 0113 on both the vertical black matrix strips and the horizontal black matrix strips), and the area of the sacrifice layer 015 is substantially the same as the combined areas of the color generating layer and the first reflective layer.

Figure 23:
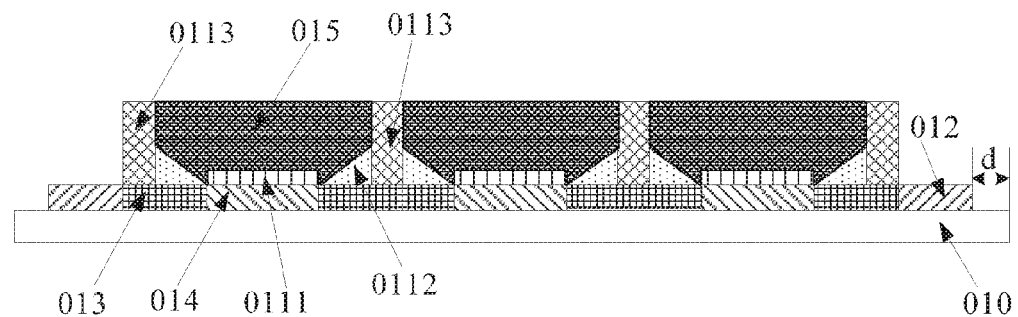
FIG. 23 is a cross-sectional view along the H-H direction of the display substrate in FIG. 21 or FIG. 22.

FIG. 23 is a cross-sectional view along the H-H direction of the display substrate in FIG. 21 or FIG. 22. Referring to FIG. 23, the sacrifice layer 015 is limited to areas corresponding to the color generating layer 0111 and the first reflective layer 0112.

Any appropriate method may be used for forming the sacrifice layer 015. Examples of such methods include, but are not limited to, coating, magnetron sputtering, and vapor deposition such as plasma enhanced chemical vapor deposition (PEVCD). In some embodiments, the method includes forming an amorphous silicon layer on the base substrate 010 having the barrier layer 0113, exposing the amorphous silicon layer using a mask plate thereby forming an exposed region and a non-exposed region, developing the exposed amorphous silicon layer, removing the amorphous silicon material within the exposed region whereas the amorphous silicon material within the non-exposed region remains, and baking the developed amorphous silicon layer thereby forming the sacrifice layer 015. Optionally, the exposed region corresponds to the color generating layer 0111 and the first reflective layer 0112. Optionally, the non-exposed region corresponds to areas other than the exposed area.

In some embodiments, the method of fabricating a pixel further includes forming a second reflective layer 0114 on a side of the sacrifice layer 015 and the barrier layer 0113 distal to the base substrate 010.

Figure 24:
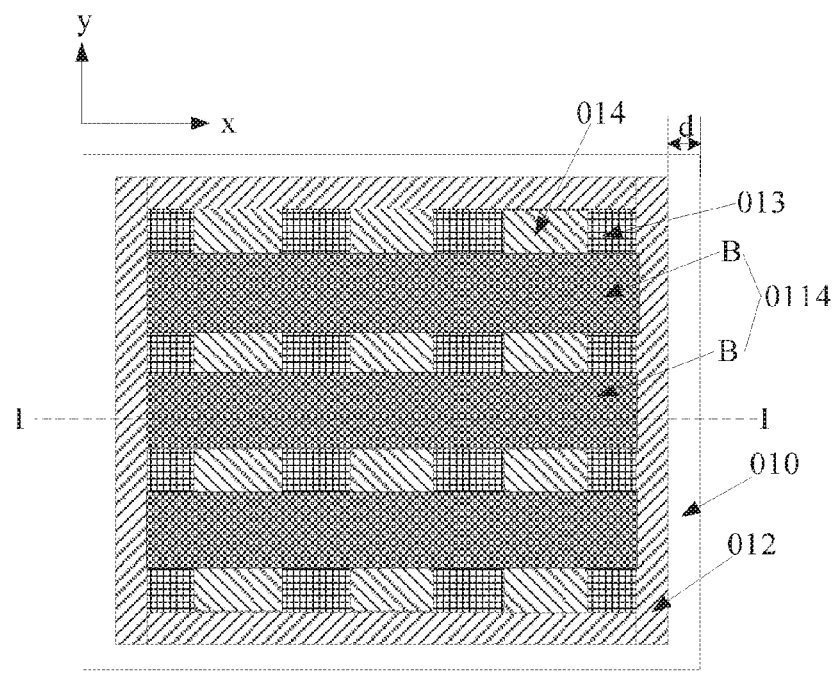
FIG. 24 is a diagram illustrating the structure of a display substrate having a second reflective layer formed on a sacrifice layer in some embodiments.
Figure 25:
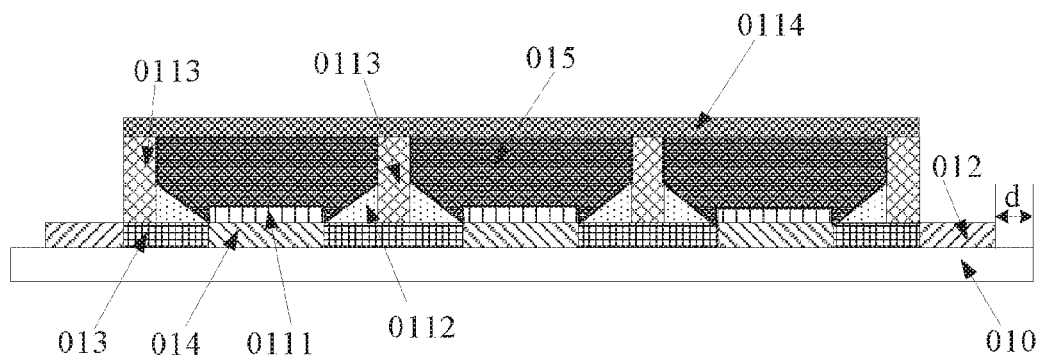
FIG. 25 is a cross-sectional view along the I-I direction of the display substrate in FIG. 24.

FIG. 24 is a diagram illustrating the structure of a display substrate having a second reflective layer 0114 formed on a sacrifice layer in some embodiments. Referring to FIG. 24, the second reflective layer 0114 includes a plurality of reflective strips B (e.g., a plurality of horizontal reflective strips B), each of which between two black matrix strips (e.g., two horizontal black matrix strips). The length directions of the plurality of horizontal reflective strips B are substantially parallel to each other and are substantially perpendicular to that of the transparent electrodes in the transparent electrode layer 014. The second reflective layer 0114 may be made of any appropriate reflective material, e.g., aluminum or an aluminum alloy. FIG. 25 is a cross-sectional view along the I-I direction of the display substrate in FIG. 24. Referring to FIG. 25, the second reflective layer 0114 is on a side of the sacrifice layer 015 and the barrier layer 0113 distal to the base substrate 010.

In some embodiments, the step of forming the second reflective layer 0114 includes forming a plurality of reflective strips B on a side of the sacrifice layer 015 and the barrier layer 0113 distal to the base substrate 010. Any appropriate method may be used for forming the plurality of reflective strips B. In some embodiments, the method includes depositing a reflective material layer (e.g., a reflective metal film such as an aluminum film or an aluminum alloy film) on a base substrate having the sacrifice layer 015 by, e.g., coating, magnetron sputtering, and vapor deposition such as plasma enhanced chemical vapor deposition (PEVCD), forming a photoresist layer on the reflective material layer, exposing and developing the photoresist layer, etching and removing the reflective material layer thereby forming the second reflective layer 0114 (e.g., the plurality of reflective strips B) on a side of the sacrifice layer 015 and the barrier layer 0113 distal to the base substrate 010.

In some embodiments, the method of fabricating a pixel further includes forming at least one light transmissive area and a light reflective area in the reflective material layer thereby forming the second reflective layer. The light transmissive area corresponds to the first reflective layer, the projection of the light transmissive area on the base substrate substantially overlaps with that of the first reflective layer. Optionally, the projection of the light transmissive area on the base substrate is substantially within that of the first reflective layer. The light reflective area corresponds to the color generating layer, the projection of the color generating layer on the base substrate substantially overlaps with that of the light reflective area. Optionally, the projection of the color generating layer on the base substrate is substantially within that of the light reflective area.

Optionally, the second reflective layer 0114 includes a plurality of reflective strips B. Optionally, the method includes forming at least one light transmissive area and a light reflective area in each of the plurality of reflective strips B.

Figure 26:
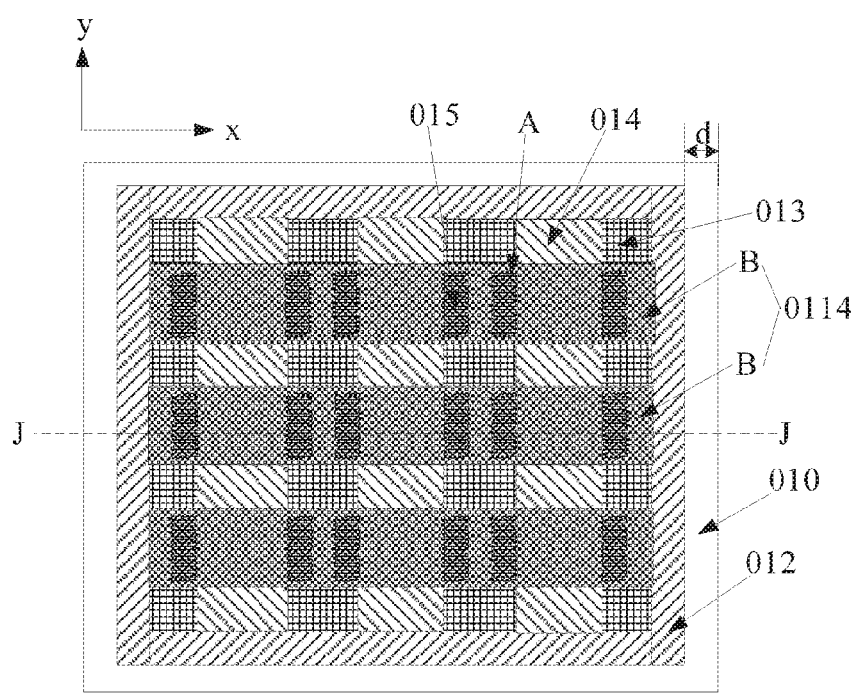
FIG. 26 a plan view of a second reflective layer having light transmissive areas in a display substrate in some embodiments.

FIG. 26 a plan view of a second reflective layer 0114 having light transmissive areas A in a display substrate in some embodiments. Referring to FIG. 26, each reflective strip B contains at least one light transmissive area A. The light reflective areas in each reflective strip B correspond to the color generating layer.

In FIG. 26, the transparent electrodes in the transparent electrode layer 014 are strip electrodes (e.g., a strip electrode extending through a plurality of pixels). The transparent electrodes are between two neighboring vertical black matrix strips. In FIG. 26, the light transmissive areas A correspond to the first reflective layer on the vertical black matrix strips. The light reflective areas correspond to the color generating layer.

In some embodiments, the transparent electrodes in the transparent electrode layer 014 are strip electrodes (e.g., a strip electrode extending through a plurality of pixels), and the transparent electrodes are between two neighboring horizontal black matrix strips. In that case, the light transmissive areas A correspond to the first reflective layer on the horizontal black matrix strips. The light reflective areas correspond to the color generating layer.

Figure 27:
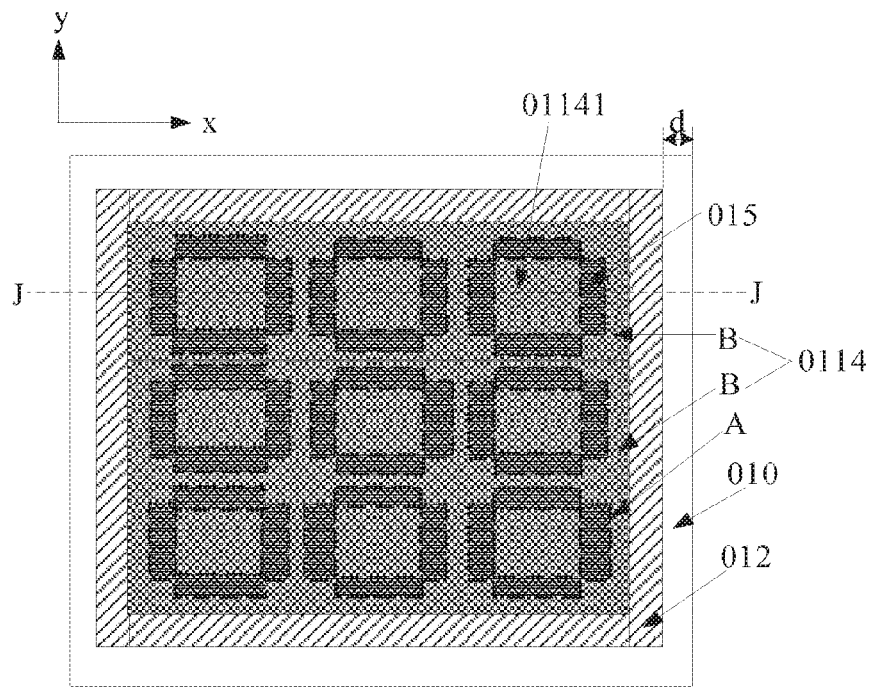
FIG. 27 a plan view of a second reflective layer having light transmissive areas in a display substrate in some embodiments.

In some embodiments, the transparent electrodes in the transparent electrode layer 014 are block electrodes (e.g., square-shaped electrodes as shown in FIG. 10), and the barrier layer and the first reflective layer may be formed on both the vertical black matrix strips and the horizontal black matrix strips. FIG. 27 is a plan view of a second reflective layer having light transmissive areas in a display substrate in some embodiments. Referring to FIG. 27, the light transmissive areas A correspond to the first reflective layer on both the vertical black matrix strips and the horizontal black matrix strips. The light reflective areas correspond to the color generating layer, which is surrounded by the first reflective layer on four sides.

Figure 28:
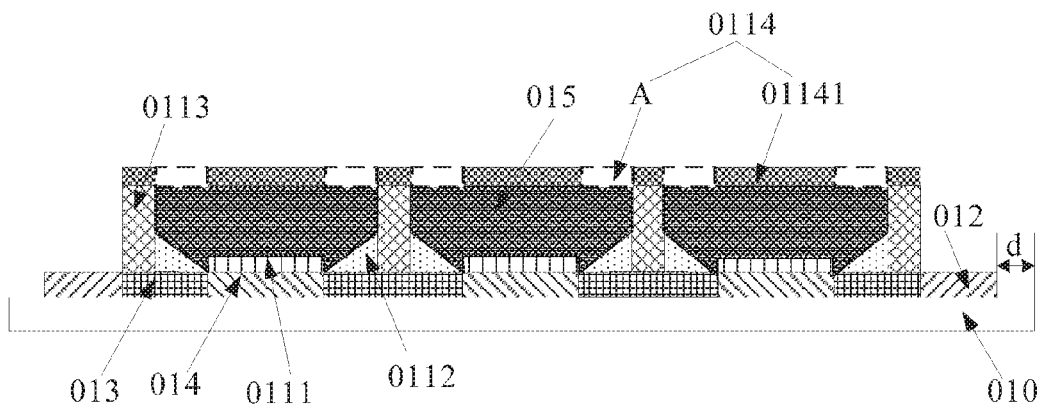
FIG. 28 is a cross-sectional view along the J-J direction of the display substrate in FIG. 26 or FIG. 27.

FIG. 28 is a cross-sectional view along the J-J direction of the display substrate in FIG. 26 or FIG. 27. Referring to FIG. 28, the second reflective layer 0114 includes at least one light transmissive area A and a light reflective area 01141. The light transmissive area A corresponds to the first reflective layer 0112, the projection of the light transmissive area A on the base substrate 010 substantially overlaps with that of the first reflective layer 0112. Optionally, the projection of the light transmissive area A on the base substrate 010 is substantially within that of the first reflective layer 0112. The light reflective area 01141 corresponds to the color generating layer 0111, the projection of the color generating layer 0111 on the base substrate 010 substantially overlaps with that of the light reflective area 01141. Optionally, the projection of the color generating layer 0111 on the base substrate 010 is substantially within that of the light reflective area 01141.

In some embodiments, each light transmissive area A is a gap in the second reflective layer 0114. The gap may be formed by a patterning process, e.g., exposure, developing, and etching processes. For example, the patterning process may include exposing a resin layer over the reflective material layer using a mask plate thereby forming an exposed region and a non-exposed region, developing the exposed resin layer, removing the resin material within the exposed region thereby exposing the reflective material within the exposed region, and etching the reflective material within the exposed region thereby forming the gap in the reflective material layer.

In some embodiments, the light transmissive area. A includes a light transmissive material (e.g., a transparent material such as a transparent resin material).

In some embodiments, the method of fabricating a pixel further includes removing the sacrifice layer, thereby forming a hollow chamber surrounded by the color generating layer, the first reflective layer, the barrier layer, and the second reflective layer.

Optionally, the step of removing the sacrifice layer is performed subsequent to the step of forming the light transmissive area A. The method includes forming the light transmissive area A in the reflective material layer thereby forming the second reflective layer 0114, and removing the sacrifice layer 015, thereby forming a hollow chamber surrounded by the color generating layer 0111, the first reflective layer 0112, the barrier layer 0113, and the second reflective layer 0114.

Figure 29:
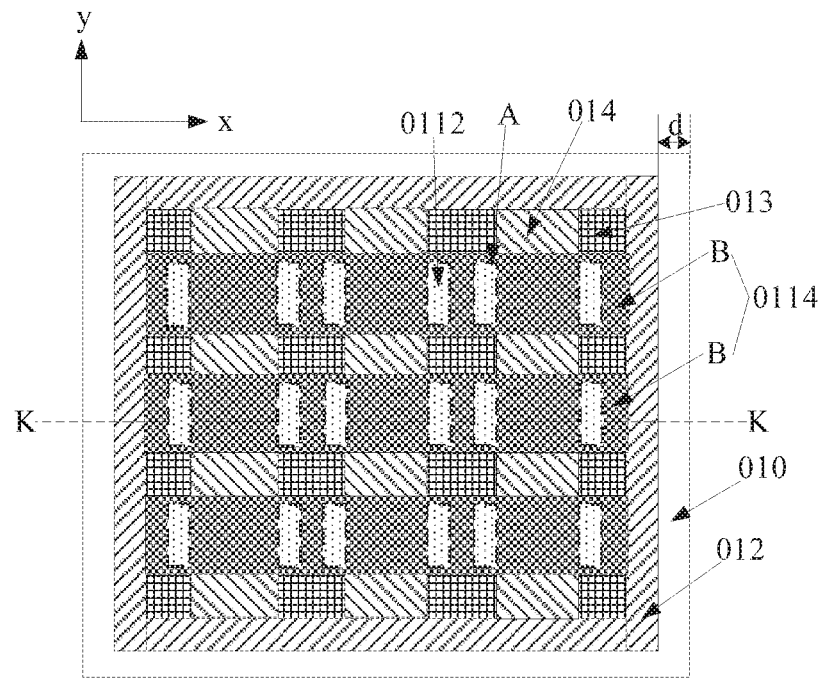
FIG. 29 is a plan view of a display substrate in some embodiments in which the sacrifice layer is removed.

FIG. 29 is a plan view of a display substrate in some embodiments in which the sacrifice layer is removed. Referring to FIG. 29, the transparent electrodes in the transparent electrode layer 014 are strip electrodes (e.g., a strip electrode extending through a plurality of pixels), and the transparent electrodes are between two neighboring vertical black matrix strips 013. As shown in FIG. 29, subsequent to the removal of the sacrifice layer, the first reflective layer 0112 (corresponding to the light transmissive areas A) is exposed. The first reflective layer 0112 are on two opposite sides of the color generating layer.

Figure 30:
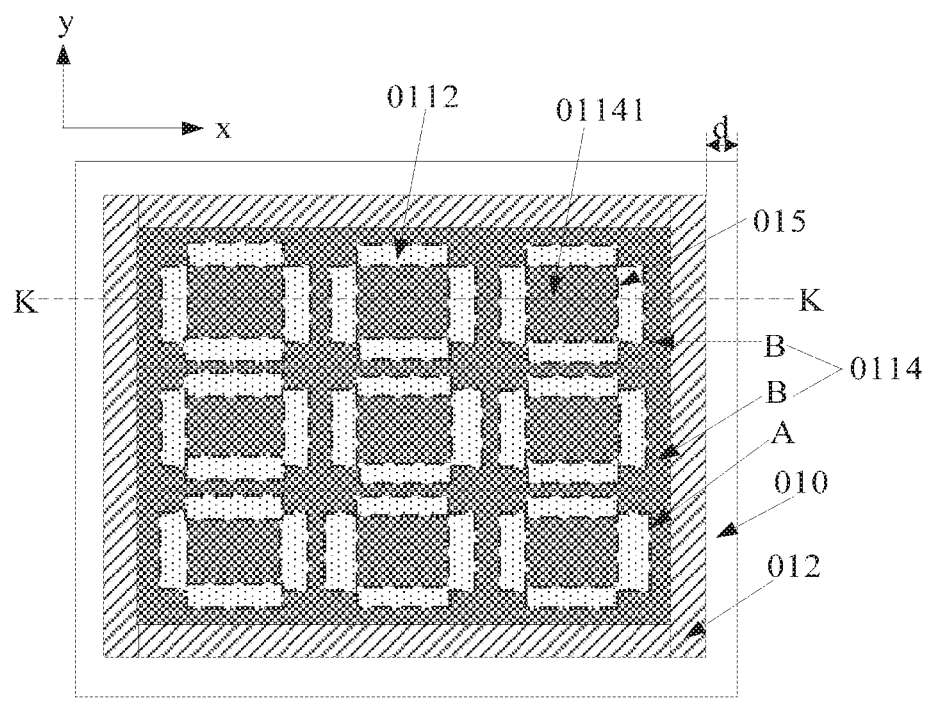
FIG. 30 is a plan view of a display substrate in some embodiments in which the sacrifice layer is removed.

FIG. 30 is a plan view of a display substrate in some embodiments in which the sacrifice layer is removed. Referring to FIG. 30, the transparent electrodes in the transparent electrode layer 014 are block electrodes (e.g., square-shaped electrodes). As shown in FIG. 30, subsequent to the removal of the sacrifice layer, the first reflective layer 0112 (corresponding to the light transmissive areas A) is exposed. The first reflective layer 0112 are on all four sides of the color generating layer.

Figure 31:
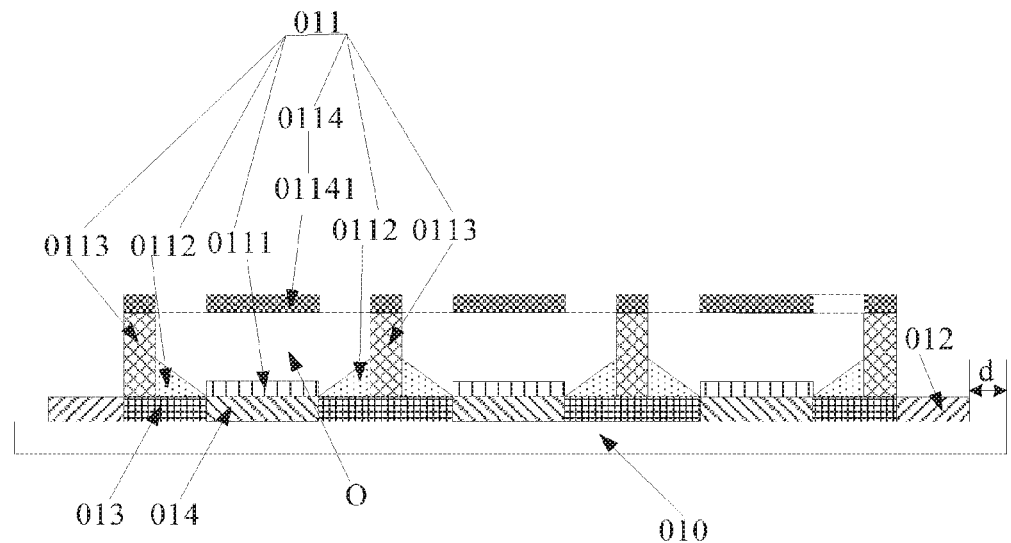
FIG. 31 is a cross-sectional view along the K-K direction of the display substrate in FIG. 29 or FIG. 30.

FIG. 31 is a cross-sectional view along the K-K direction of the display substrate in FIG. 29 or FIG. 30. As shown in FIG. 31, subsequent to the removal of the sacrifice layer, the color generating layer 0111, the first reflective layer 0112, the barrier layer 0113, and the second reflective layer 0114 form a hollow chamber O within each pixel 011. In a display panel having the present display substrate, light provided by a backlight module enters into the hollow chamber O through a light transmissive area in the second reflective layer. The light is reflected by the first reflective layer 0112. Light reflected by the first reflective layer 0112 is transmitted to the second reflective layer 0114, and reflected by the light reflective area 01141 in the second reflective layer 0114. The light reflected by the light reflective area. 01141 exits the hollow chamber O through the color generating layer 01 achieving color display in the display panel.

Optionally, the sacrifice layer 015 is removed by an etchant solution. Optionally, the etchant is a fluorine-containing etching solution.

When a voltage potential is applied between the second reflective layer 0114 and the transparent electrode layer 014, the interaction between the second reflective layer 0114 and the transparent electrode layer 014 is determined by Coulomb force between the two. By adjusting the voltage difference between the second reflective layer 0114 and the transparent electrode layer 014, the gray level gradient of the image can be accordingly adjusted. Optionally, a first voltage in one direction of polarity is applied to the second reflective layer 0114 (e.g., a voltage of +10 V) and a second voltage in an opposite direction of polarity is applied to the transparent electrode layer 014 (e.g., a voltage of −10 V), the second reflective layer 0114 and the transparent electrode layer 014 have opposite charge. In this case, an attractive coulomb force is formed between the two, drawing a portion of the second reflective layer 0114 corresponding to the transparent electrode layer 014 towards the transparent electrode layer 014. When the portion of the second reflective layer 0114 corresponding to the transparent electrode layer 014 is drawn to a position in close proximity to the color generating layer 0111 (which covers a corresponding portion of transparent electrode layer 014), the color generation layer 0111 is turned off. When the voltages on the second reflective layer 0114 and the transparent electrode layer 014 are withdrawn or reduced, the portion of the second reflective layer 0114 corresponding to the transparent electrode layer 014 recovers from the attracted state and moves away from the color generating layer 0111, the color generating layer 0111 is turned on again. Optionally, voltages of a same direction of polarity may be applied to both the second reflective layer 0114 and the transparent electrode layer 014 (e.g., both applied with a voltage of +10 V) to turn on the color generating layer 0111 with a shorter response time. In this case, a repulsive coulomb force is formed between the second reflective layer 0114 and the transparent electrode layer 014. The two layers repel each other, moving the portion of the second reflective layer 0114 corresponding to the transparent electrode layer 014 away from the transparent electrode layer 014. The color generating layer 0111 on the transparent electrode layer 014 is turned on again. The present display substrate utilizes the coulomb force for turning on and off the color generating layer 0111, a highly reliable control of the color generating layer 0111 can be achieved.

Based on the above, the present disclosure provides a method of fabricating a display substrate. The display substrate fabricated by the present method includes a plurality of pixels, each of which includes a hollow chamber formed by a color generating layer, a first reflective layer, a barrier layer and a second reflective layer. The display substrate is assembled with a backlight module to form a display panel. In the display panel, light provided by the backlight module enters into the hollow chamber through a light transmissive area in the second reflective layer. The light is reflected by the first reflective layer and the second reflective layer, and exits the hollow chamber through the color generating layer. Accordingly, the present display panel does not require a liquid crystal layer or a polarizer. Light absorption by the liquid crystal layer and the polarizer is avoided in the present display panel. Thus, loss of light illuminance and energy is minimized in the present display panel and display apparatus.

Figure 32:
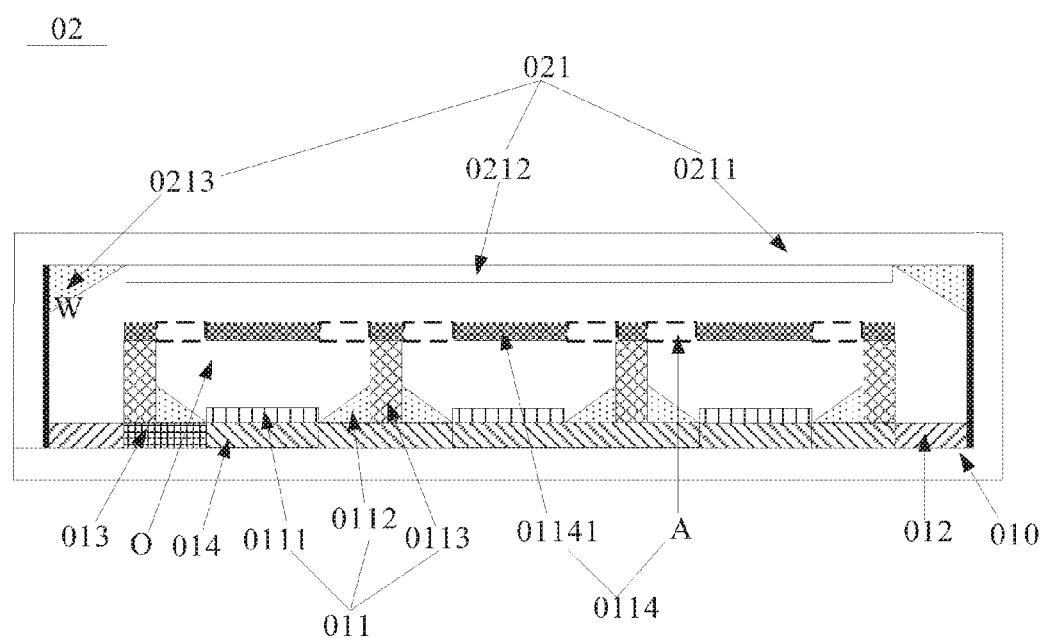
FIG. 32 is a diagram illustrating the structure of a display apparatus in some embodiments.

In another aspect, the present disclosure further provides a display apparatus. FIG. 32 is a diagram illustrating the structure of a display apparatus 02 in some embodiments. Referring to FIG. 32, the display apparatus 02 in the embodiment includes a backlight module 021 and a display substrate as described herein or fabricated by a method as described herein. The display substrate and the backlight module 021 are assembled to form a display apparatus. Optionally, the display substrate is a display substrate of FIG. 1 or FIG. 2.

As shown in FIG. 32, the backlight module 021 in the embodiment includes a frame 0211, a light guide plate 0212, and a reflector 0213. The backlight module 021 and the display substrate are assembled together into a display apparatus 02 through the frame 0211 in the backlight module 021.

In FIG. 32, the light guide plate 0212 is on a side of the frame 0211 proximal to the display substrate. The reflector 0213 is between the light guide plate 0212 and the frame 0211, surrounding the light guide plate 0212. The reflector 0213 is at a position corresponding to the light condensing layer 012 in the display substrate. The projection of the light reflecting surface W of the reflector 0213 on the display substrate corresponds to that of the light condensing layer 012. Optionally, the projection of the light reflecting surface W of the reflector 0213 on the display substrate at least partially overlaps with that of the light condensing layer 012. Optionally, the projection of the light reflecting surface W of the reflector 0213 on the display substrate substantially overlaps with that of the light condensing layer 012. Optionally, the reflector 0213 is a triangular prism.

Light from a light source enters into the interior of the display apparatus 02 through the light condensing layer 012. The light passed through the light condensing layer 012 is then reflected by the reflector 0213. The reflected light enters into the light guide plate 0212, and is transmitted to the display substrate through the light guide plate 0212. The light transmitted from the light guide plate 0212 enters into each pixel 011 through the light transmissive area A, and enters into the hollow chamber formed by the color generating layer 0111, the first reflective layer 0112, the barrier layer 0113, and the second reflective layer 0114. The light in the hollow chamber is reflected by the first reflective layer 0112. Light reflected by the first reflective layer 0112 is transmitted to the second reflective layer 0114, and reflected by the light reflective area 01141 in the second reflective layer 0114. The light reflected by the light reflective area 01141 exits the hollow chamber O through the color generating layer 0111, achieving color display in the display panel. Therefore, the backlight for the display substrate is provided by the light entered into the display apparatus 02 through the light condensing layer 012, reflected by the reflector 0213 into the light guide plate 0212, and exited from the light guide plate 0212. Subsequently, the light exited from the light guide plate 0212 enters into the hollow chamber O through the light transmissive area A, sequentially reflected by the first reflective layer 0112 and the light reflective area 01141 in the second reflective layer 0114, and finally exits the hollow chamber O through the color generating layer 0111.

Figure 33:
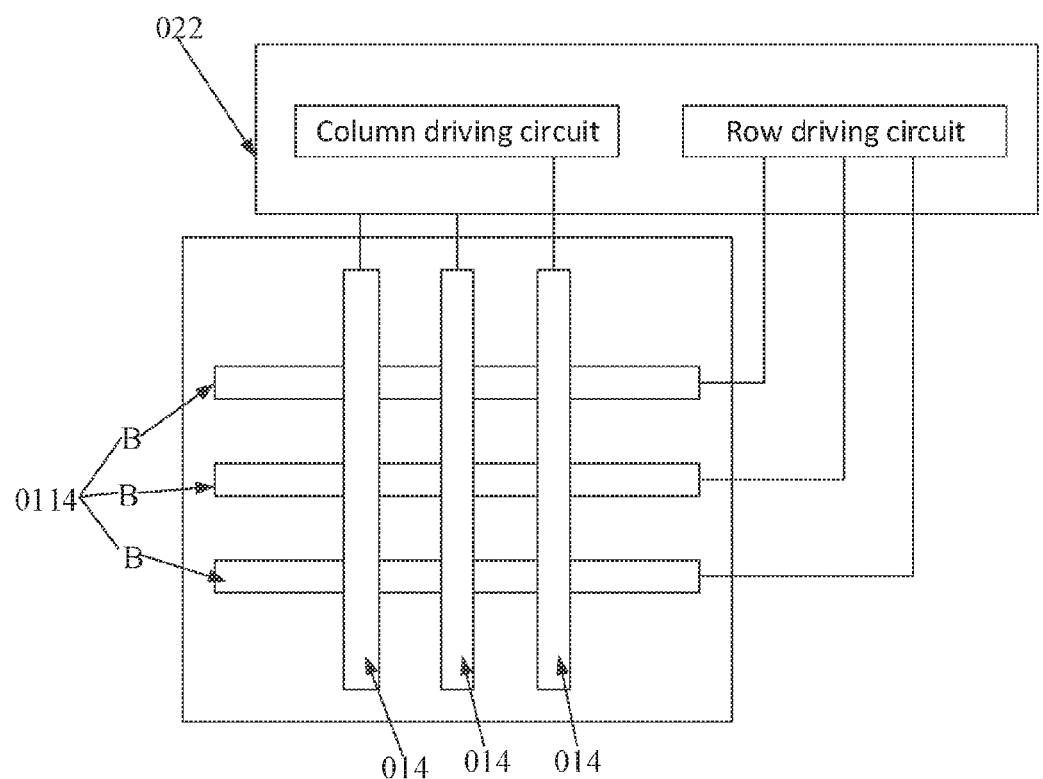
FIG. 33 is a diagram illustrating the structure of a driving circuit board in some embodiments.

In some embodiments, the display apparatus 02 also includes a driving circuit board. FIG. 33 is a diagram illustrating the structure of a driving circuit board 022 in some embodiments. Referring to FIG. 33, the driving circuit board 022 includes a plurality of row driving circuits and a plurality of column driving circuits. In some embodiments, the plurality of row driving circuits are electrically connected to the second reflecting layer 0114 for applying a voltage to the second reflecting layer 0114. Optionally, the plurality of row driving circuits are electrically connected to the plurality of reflective strips B (e.g., a plurality of horizontal reflective strips B or a plurality of vertical reflective strips B) for applying a voltage to the plurality of reflective strips B. In some embodiments, the plurality of column driving circuits are electrically connected to the transparent electrode layer 014 for applying a voltage to the transparent electrode layer 014. Optionally, the transparent electrode layer 014 includes a plurality of transparent strip electrodes (e.g., each strip electrode extending through a plurality of pixels), each column driving circuit electrically connected to a transparent strip electrode. Optionally, the transparent electrode layer 014 includes a plurality of transparent block electrodes. Optionally, a plurality of transparent block electrodes in a single row (or in a single column) are electrically connected to each other (e.g., by wire), and the entire row (or the entire column) of the transparent block electrodes is then electrically connected to a column driving circuit. When a voltage signal is applied to one transparent block electrode, the voltage signal is also applied to all block electrodes in a same row (or in a same column).

When voltages of opposite polarities are applied to the transparent electrode layer 014 and the second reflective layer 0114, a portion of the second reflective layer 0114 corresponding to the transparent electrode layer 014 is drawn towards the transparent electrode layer 014. When the portion of the second reflective layer 0114 corresponding to the transparent electrode layer 014 is drawn to a position in close proximity to the color generating layer 0111 (which covers a corresponding portion of transparent electrode layer 014), the color generation layer 0111 is turned off.

Based on the above, the present disclosure provides a display apparatus having a backlight module and a display substrate described herein or fabricated by a method described herein. The display substrate in the present display apparatus includes a plurality of pixels, each of which includes a hollow chamber formed by a color generating layer, a first reflective layer, a barrier layer and a second reflective layer. The display substrate is assembled with a backlight module to form a display panel. In the display panel, light provided by the backlight module enters into the hollow chamber through a light transmissive area in the second reflective layer. The light is reflected by the first reflective layer and the second reflective layer, and exits the hollow chamber through the color generating layer. Accordingly, the present display panel does not require a liquid crystal layer or a polarizer. Light absorption by the liquid crystal layer and the polarizer is avoided in the present display panel. Thus, loss of light illuminance and energy is minimized in the present display panel and display apparatus.

Figure 34:
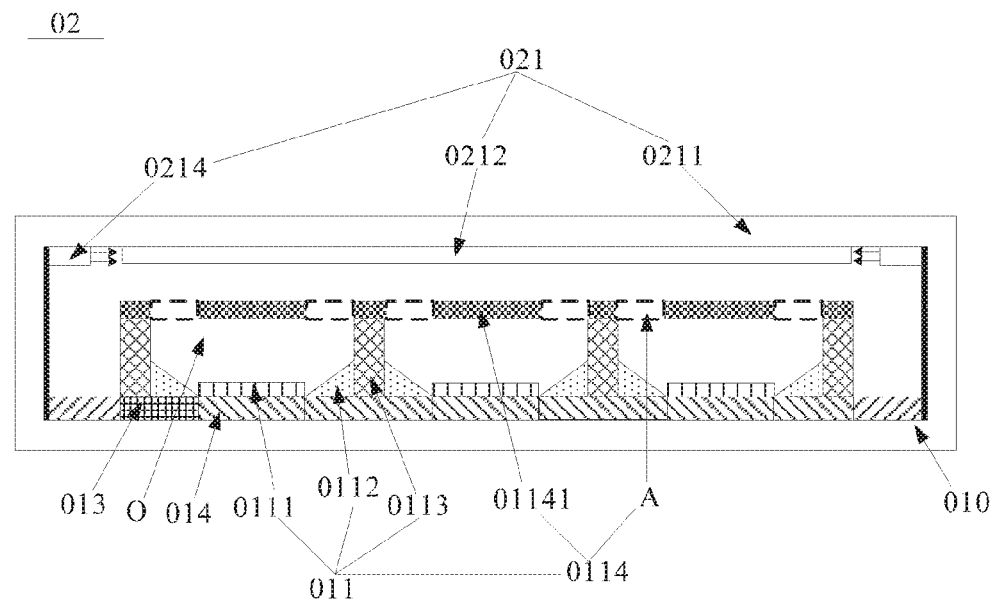
FIG. 34 is a diagram illustrating the structure of a display apparatus in some embodiments.

FIG. 34 is a diagram illustrating the structure of a display apparatus in some embodiments. Referring to FIG. 34, the display apparatus 02 in the embodiment includes a backlight module 021 and a display substrate as described herein or fabricated by a method as described herein. The display substrate and the backlight module 021 are assembled to form a display apparatus. Optionally, the display substrate is a display substrate of FIG. 1 or FIG. 2.

As shown in FIG. 34, the backlight module 021 in the embodiment includes a frame 0211, a light guide plate 0212, and a light source 0214. The backlight module 021 and the display substrate are assembled together into a display apparatus 02 through the frame 0211 in the backlight module 021.

In FIG. 34, the light guide plate 0212 is on a side of the frame 0211 proximal to the display substrate. The light source 0214 is between the light guide plate 0212 and the frame 0211, surrounding the light guide plate 0212. Optionally, the light source 0214 is one or more light tubes. Optionally, the light source 0214 includes a plurality of light emitting diode light tubes. The light source 0214 is positioned so that light emitted from the light source 0214 enters into the light guide plate 0212.

Light from a light source 0214 enters into the light guide plate 0212, and is transmitted to the display substrate through the light guide plate 0212. The light transmitted from the light guide plate 0212 enters into each pixel 011 through the light transmissive area A, and enters into the hollow chamber formed by the color generating layer 0111, the first reflective layer 0112, the barrier layer 0113, and the second reflective layer 0114. The light in the hollow chamber is reflected by the first reflective layer 0112. Light reflected by the first reflective layer 0112 is transmitted to the second reflective layer 0114, and reflected by the light reflective area 01141 in the second reflective layer 0114. The light reflected by the light reflective area 01141 exits the hollow chamber O through the color generating layer 0111, achieving color display in the display panel. Therefore, the backlight for the display substrate is provided by the light emitted from the light source 0214 and entered into the light guide plate 0212, transmitted throughout the light guide plate 0212, and exited from the light guide plate 0212. Subsequently, the light exited from the light guide plate 0212 enters into the hollow chamber O through the light transmissive area A, sequentially reflected by the first reflective layer 0112 and the light reflective area 01141 in the second reflective layer 0114, and finally exits the hollow chamber O through the color generating layer 0111.

In some embodiments, the display apparatus 02 also includes a driving circuit board. FIG. 33 is a diagram illustrating the structure of a driving circuit board 022 in some embodiments. Referring to FIG. 33, the driving circuit board 022 includes a plurality of row driving circuits and a plurality of column driving circuits. In some embodiments, the plurality of row driving circuits are electrically connected to the second reflecting layer 0114 for applying a voltage to the second reflecting layer 0114. In some embodiments, the plurality of column driving circuits are electrically connected to the transparent electrode layer 014 for applying a voltage to the transparent electrode layer 014. When voltages of opposite polarities are applied to the transparent electrode layer 014 and the second reflective layer 0114, a portion of the second reflective layer 0114 corresponding to the transparent electrode layer 014 is drawn towards the transparent electrode layer 014. When the portion of the second reflective layer 0114 corresponding to the transparent electrode layer 014 is drawn to a position in close proximity to the color generating layer 0111 (which covers a corresponding portion of transparent electrode layer 014), the color generation layer 0111 is turned off.

Based on the above, the present disclosure provides a display apparatus having a backlight module and a display substrate described herein or fabricated by a method described herein. The display substrate in the present display apparatus includes a plurality of pixels, each of which includes a hollow chamber formed by a color generating layer, a first reflective layer, a barrier layer and a second reflective layer. The display substrate is assembled with a backlight module to form a display panel. In the display panel, light provided by the backlight module enters into the hollow chamber through a light transmissive area in the second reflective layer. The light is reflected by the first reflective layer and the second reflective layer, and exits the hollow chamber through the color generating layer. Accordingly, the present display panel does not require a liquid crystal layer or a polarizer. Light absorption by the liquid crystal layer and the polarizer is avoided in the present display panel. Thus, loss of light illuminance and energy is minimized in the present display panel and display apparatus.

Figure 35:
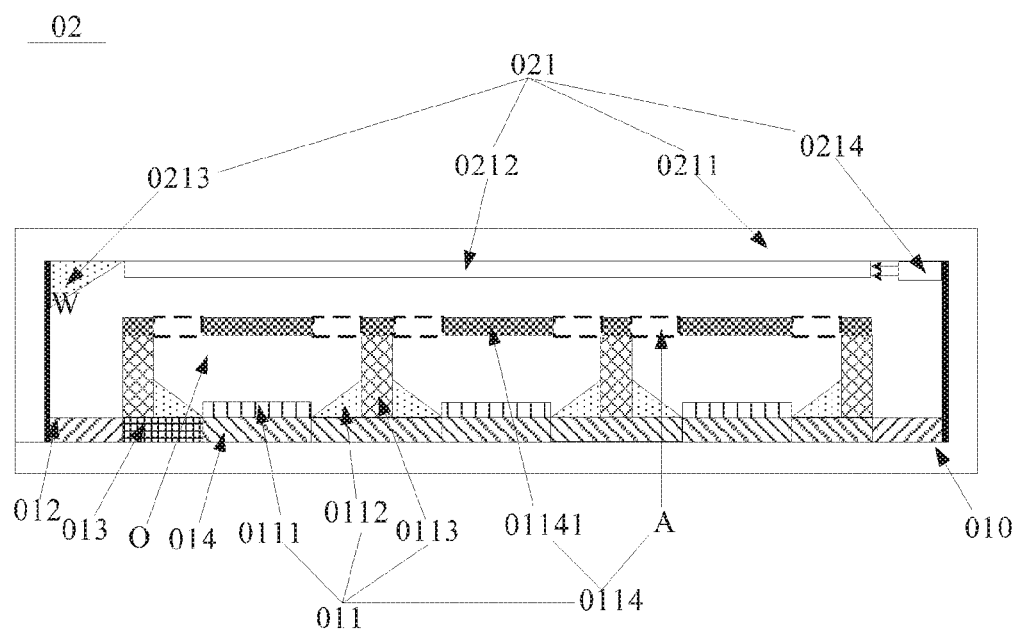
FIG. 35 is a diagram illustrating the structure of a display apparatus in some embodiments.

FIG. 35 is a diagram illustrating the structure of a display apparatus in some embodiments. Referring to FIG. 35, the display apparatus 02 in the embodiment includes a backlight module 021 and a display substrate as described herein or fabricated by a method as described herein. The display substrate and the backlight module 021 are assembled to form a display apparatus. Optionally, the display substrate is a display substrate of FIG. 1 or FIG.

As shown in FIG. 35, the backlight module 021 in the embodiment includes a frame 0211, a light guide plate 0212, a reflector 0213, and a light source 0214. The backlight module 021 and the display substrate are assembled together into a display apparatus 02 through the frame 0211 in the backlight module 021.

In FIG. 35, the light guide plate 0212 is on a side of the frame 0211 proximal to the display substrate. The reflector 0213 is between the light guide plate 0212 and the frame 0211, abutting at least one side of the light guide plate 0212. The reflector 0213 is at a position corresponding to the light condensing layer 012 in the display substrate. The projection of the light reflecting surface W of the reflector 0213 on the display substrate corresponds to that of the light condensing layer 012. Optionally, the projection of the light reflecting surface W of the reflector 0213 on the display substrate at least partially overlaps with that of the light condensing layer 012. Optionally, the projection of the light reflecting surface W of the reflector 0213 on the display substrate substantially overlaps with that of the light condensing layer 012. Optionally, the reflector 0213 is a triangular prism.

In FIG. 35, the light source 0214 is between the light guide plate 0212 and the frame 0211, abutting at least one side of the light guide plate 0212 (e.g., sides without a reflector 0213). Optionally, the light source 0214 is one or more light tubes. Optionally, the light source 0214 includes a plurality of light emitting diode light tubes. The light source 0214 is positioned so that light emitted from the light source 0214 enters into the light guide plate 0212.

Light from a light source enters into the interior of the display apparatus 02 through the light condensing layer 012. The light passed through the light condensing layer 012 is then reflected by the reflector 0213. The reflected light enters into the light guide plate 0212, and is transmitted to the display substrate through the light guide plate 0212. The light transmitted from the light guide plate 0212 enters into each pixel 011 through the light transmissive area A, and enters into the hollow chamber formed by the color generating layer 0111, the first reflective layer 0112, the barrier layer 0113, and the second reflective layer 0114. The light in the hollow chamber is reflected by the first reflective layer 0112. Light reflected by the first reflective layer 0112 is transmitted to the second reflective layer 0114, and reflected by the light reflective area 01141 in the second reflective layer 0114. The light reflected by the light reflective area 01141 exits the hollow chamber O through the color generating layer 0111.

Light from a light source 0214 enters into the light guide plate 0212, and is transmitted to the display substrate through the light guide plate 0212. The light transmitted from the light guide plate 0212 enters into each pixel 011 through the light transmissive area A, and enters into the hollow chamber formed by the color generating layer 0111, the first reflective layer 0112, the barrier layer 0113, and the second reflective layer 0114. The light in the hollow chamber is reflected by the first reflective layer 0112. Light reflected by the first reflective layer 0112 is transmitted to the second reflective layer 0114, and reflected by the light reflective area 01141 in the second reflective layer 0114. The light reflected by the light reflective area 01141 exits the hollow chamber O through the color generating layer 0111.

Therefore, the backlight for the display substrate is partially provided by (1) the light entered into the display apparatus 02 through the light condensing layer 012, reflected by the reflector 0213 into the light guide plate 0212, and exited from the light guide plate 0212; and (2) the light emitted from the light source 0214 and entered into the light guide plate 0212, transmitted throughout the light guide plate 0212, and exited from the light guide plate 0212. Subsequently, the light exited from the light guide plate 0212 enters into the hollow chamber O through the light transmissive area A, sequentially reflected by the first reflective layer 0112 and the light reflective area 01141 in the second reflective layer 0114, and finally exits the hollow chamber C) through the color generating layer 0111.

In some embodiments, the display apparatus 02 also includes a driving circuit board. FIG. 33 is a diagram illustrating the structure of a driving circuit board 022 in some embodiments. Referring to FIG. 33, the driving circuit board 022 includes a plurality of row driving circuits and a plurality of column driving circuits. In some embodiments, the plurality of row driving circuits are electrically connected to the second reflecting layer 0114 for applying a voltage to the second reflecting layer 0114. In some embodiments, the plurality of column driving circuits are electrically connected to the transparent electrode layer 014 for applying a voltage to the transparent electrode layer 014. When voltages of opposite polarities are applied to the transparent electrode layer 014 and the second reflective layer 0114, a portion of the second reflective layer 0114 corresponding to the transparent electrode layer 014 is drawn towards the transparent electrode layer 014. When the portion of the second reflective layer 0114 corresponding to the transparent electrode layer 014 is drawn to a position in close proximity to the color generating layer 0111 (which covers a corresponding portion of transparent electrode layer 014), the color generation layer 0111 is turned off.

Based on the above, the present disclosure provides a display apparatus having a backlight module and a display substrate described herein or fabricated by a method described herein. The display substrate in the present display apparatus includes a plurality of pixels, each of which includes a hollow chamber formed by a color generating layer, a first reflective layer, a barrier layer and a second reflective layer. The display substrate is assembled with a backlight module to form a display panel. In the display panel, light provided by the backlight module enters into the hollow chamber through a light transmissive area in the second reflective layer. The light is reflected by the first reflective layer and the second reflective layer, and exits the hollow chamber through the color generating layer. Accordingly, the present display panel does not require a liquid crystal layer or a polarizer. Light absorption by the liquid crystal layer and the polarizer is avoided in the present display panel. Thus, loss of light illuminance and energy is minimized in the present display panel and display apparatus.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display substrate, comprising:
    a base substrate; and
    a plurality of pixels on the base substrate;
    wherein each of the plurality of pixels comprises:
        a color generating layer on the base substrate;
        a first reflective layer surrounding at least one side of the color generating layer in plan view of the base substrate; and
        a second reflective layer having a light transmissive area and a light reflective area, the light transmissive area spaced apart from the first reflective layer in a direction perpendicular to the base substrate, the light reflective area configured to be spaced apart from the color generating layer in the direction perpendicular to the base substrate by an adjustable distance relative to the color generating layer;
        wherein the first reflective layer is configured to reflect an incident light transmitted through the light transmissive area to the light reflective area, the light reflective area and the color generating layer are configured to direct the incident light reflected by the first reflective layer in a direction so that it may pass through the color generating layer.

2. The display substrate of claim 1, wherein a projection of the light transmissive area on the base substrate is substantially within that of the first reflective layer, and a projection of the color generating layer on the base substrate is substantially within that of the light reflective area.

3. The display substrate of claim 1, further comprising a barrier layer having a plurality of spacers, the first reflective layer and the color generating layer spaced apart from the second reflective layer by the plurality of spacers in the direction perpendicular to the base substrate.

4. The display substrate of claim 3, further comprising a black matrix array comprising a plurality of horizontal black matrix strips and a plurality of vertical black matrix strips intersecting each other in a same layer, and dividing a display region of the display substrate into a plurality of open areas; wherein a projection of the color generating layer on the base substrate is substantially within that of the plurality of open areas; a projection of the barrier layer and the first reflective layer on the base substrate is substantially within that of the black matrix array.

5. The display substrate of claim 4, further comprising a transparent electrode layer comprising a plurality of transparent electrodes, wherein the projection of the color generating layer on the base substrate is substantially within that of the transparent electrode layer.

6. The display substrate of claim 5, wherein the color generating layer is on a side of the transparent electrode layer distal to the base substrate.

7. The display substrate of claim 5, wherein the transparent electrode layer comprises a plurality of strip electrodes, each of which extending through a plurality of pixels in a row and is sandwiched by two neighboring horizontal black matrix strips; and the second reflective layer comprises a plurality of vertical reflective strips, each of which sandwiched by two neighboring vertical black matrix strips.

8. The display substrate of claim 5, wherein the transparent electrode layer comprises a plurality of block electrodes, wherein a projection of the transparent electrode layer on the base substrate is substantially within that of the plurality of open areas.

9. The display substrate of claim 4, wherein the second reflective layer within each pixel comprises a light reflective area and at least a light transmissive area; the first reflective layer is configured to reflect an incident light transmitted through the at least one light transmissive area to the light reflective area, the light reflective area and the color generating layer are configured to direct the incident light reflected by the first reflective layer in a direction so that it may pass through the color generating layer; wherein a projection of the light reflective area on the base substrate is substantially within that of the plurality of open areas, and a projection of the at least one light transmissive area on the base substrate is substantially within that of the black matrix array.

10. The display substrate of claim 9, wherein the projection of the at least one light transmissive area on the base substrate is substantially within that of the first reflective layer; and the projection of the color generating layer on the base substrate is substantially within that of the light reflective area.

11. The display substrate of claim 9, wherein the projection of the at least one light transmissive area on the base substrate substantially overlaps with that of the first reflective layer; and the projection of the color generating layer on the base substrate substantially overlaps with that of the light reflective area.

12. The display substrate of claim 3, wherein the first reflective layer in each pixel abuts at least two sides of the color generating layer in plan view of the base substrate;
    the barrier layer in each pixel comprises at least two spacers on at least two opposite sides of the color generating layer in plan view of the base substrate, respectively; each of the at least two spacers spaced apart from the color generating layer by the first reflective layer in plan view of the base substrate; and
    the second reflective layer is on a side of the barrier layer distal to the base substrate, the second reflective layer and the color generating layer are spaced apart by the at least two spacers of the barrier layer.

13. The display substrate of claim 1, further comprising a light condensing layer on a peripheral region of the display substrate for introducing the incident light from a light source.

14. The display substrate of claim 9, wherein the first reflective layer is a triangular prism having a reflecsurface, a projection of the reflective surface on the base substrate substantially overlaps with that of the light transmissive area.

15. A method of fabricating a display substrate comprising:
    forming a color generating layer on the base substrate;
    forming a first reflective layer surrounding at least one side of the color generating layer in plan view of the base substrate; and
    forming a second reflective layer having a light transmissive area and a light reflective area, the light transmissive area spaced apart from the first reflective layer in a direction perpendicular to the base substrate, the light reflective area configured to be spaced apart from the color generating layer in the direction perpendicular to the base substrate by an adjustable distance relative to the color generating layer;
    wherein the first reflective layer is configured to reflect an incident light transmitted through the light transmissive area to the light reflective area; the light reflective area and the color generating layer are configured to direct the incident light reflected by the first reflective layer in a direction so that it may pass through the color generating layer.

16. The method of claim 15, prior to forming the second reflective layer, further comprising forming a sacrifice layer on a side of the color generating layer and the first reflective layer distal to the base substrate;
    the step of forming the second reflective layer comprising forming a reflective material layer on a side of the sacrifice layer distal to the bases substrate; and forming the light transmissive area and the light reflective area in the reflective material layer thereby forming the second reflective layer;
    subsequent to the step of forming the light transmissive area and the light reflective area, the method further comprising removing the sacrifice layer.

17. The method of claim 16, prior to forming the sacrifice layer, the method further comprising forming a barrier layer having a plurality of spacers, the first reflective layer and the color generating layer spaced apart from the second reflective layer by the plurality of spacers in the direction perpendicular to the base substrate; the sacrifice layer is formed in areas between the plurality of spacers.

18. A display apparatus, comprising:
    the display substrate of claim 1,
    a backlight module comprising a frame for retaining the display substrate; and
    a light guide plate on a side of the frame proximal to the display substrate,
    wherein the light guide plate comprises a light incident surface and a light emitting surface, the light emitting surface proximal to the display substrate for providing the incident light to the light transmissive area in the display substrate.

19. The display apparatus of claim 18, wherein the backlight module further comprises a reflector at a position corresponding to the light condensing layer in the display substrate, the reflector is configured to reflect the incident light introduced by the light condensing layer into the light guide plate.

20. A method of controlling display of an image on a display apparatus having a display substrate comprising a base substrate and a plurality of pixels on the base substrate; each pixel comprising a color generating layer on the base substrate; a first reflective layer surrounding at least one side of the color generating layer in plan view of the base substrate; a second reflective layer having a light transmissive area and a light reflective area, the light transmissive area spaced apart from the first reflective layer in a direction perpendicular to the base substrate, the light reflective area configured to be spaced apart from the color generating layer in the direction perpendicular to the base substrate by an adjustable distance relative to the color generating layer; and a transparent electrode layer comprising a plurality of transparent electrodes; wherein the first reflective layer is configured to reflect an incident light transmitted through the light transmissive area to the light reflective area, the light reflective area and the color generating layer are configured to direct the incident light reflected by the first reflective layer in a direction so that it may pass through the color generating layer; and the projection of the color generating layer on the base substrate is substantially within that of the transparent electrode layer;
    the method comprising:
    applying a first voltage to the second reflecting layer;
    applying a second voltage to the transparent electrode layer; and
    adjusting a gray level gradient of a pixel of an image by adjusting a voltage difference between the first voltage and the second voltage;
    wherein the gray level gradient is adjusted by changing the adjustable distance, which is in turn controlled by adjusting the voltage difference.

* * * * *